United States Patent
Nakanishi

(10) Patent No.: US 8,467,125 B2
(45) Date of Patent: Jun. 18, 2013

(54) IMAGE TAKING OPTICAL SYSTEM AND IMAGE TAKING APPARATUS

(75) Inventor: Hitoshi Nakanishi, Kanagawa (JP)

(73) Assignee: Sony Corporation (JP)

( * ) Notice: Subject to any disclaimer, the term of this patent is extended or adjusted under 35 U.S.C. 154(b) by 331 days.

(21) Appl. No.: 12/924,120

(22) Filed: Sep. 21, 2010

(65) Prior Publication Data

US 2011/0080636 A1    Apr. 7, 2011

(30) Foreign Application Priority Data

Oct. 1, 2009    (JP) ............................... P2009-229577

(51) Int. Cl.
    *G02B 5/08*    (2006.01)

(52) U.S. Cl.
    USPC ............................ 359/359; 359/350; 359/586

(58) Field of Classification Search
    USPC .................. 359/350–361, 577–590, 634, 642
    See application file for complete search history.

(56) References Cited

U.S. PATENT DOCUMENTS

| | | | | |
|---|---|---|---|---|
| 6,462,866 | B1 * | 10/2002 | Sugiyama et al. | 359/359 |
| 7,085,219 | B2 * | 8/2006 | Ohta | 369/112.26 |
| 7,411,729 | B2 | 8/2008 | Iyama et al. | |
| 2003/0165018 | A1 * | 9/2003 | Mihara | 359/680 |
| 2008/0100910 | A1 * | 5/2008 | Kim et al. | 359/356 |
| 2008/0285119 | A1 | 11/2008 | Iyama et al. | |
| 2011/0007204 | A1 * | 1/2011 | Yamano | 348/362 |

FOREIGN PATENT DOCUMENTS

JP    2006-220873 A    8/2006

* cited by examiner

*Primary Examiner* — Thong Nguyen
(74) *Attorney, Agent, or Firm* — Lerner, David, Littenberg, Krumholz & Mentlik, LLP

(57) ABSTRACT

Disclosed herein is an image taking optical system including at least one lens provided on an optical path; a first infrared-ray absorption filter made from a resin material with a film shape and provided on the optical path; a multi-layer film provided with an infrared-ray absorption function and provided on the optical path; and a second infrared-ray absorption filter made from a resin material with a film shape and provided on the optical path, wherein the first infrared-ray absorption filter, the multi-layer film and the second infrared-ray absorption filter are provided at locations arranged along the optical path in a direction from a photographing-object side to an image side, and the multi-layer film has a spectroscopic-characteristic adjustment function and a light reflection characteristic.

11 Claims, 11 Drawing Sheets

F I G . 7
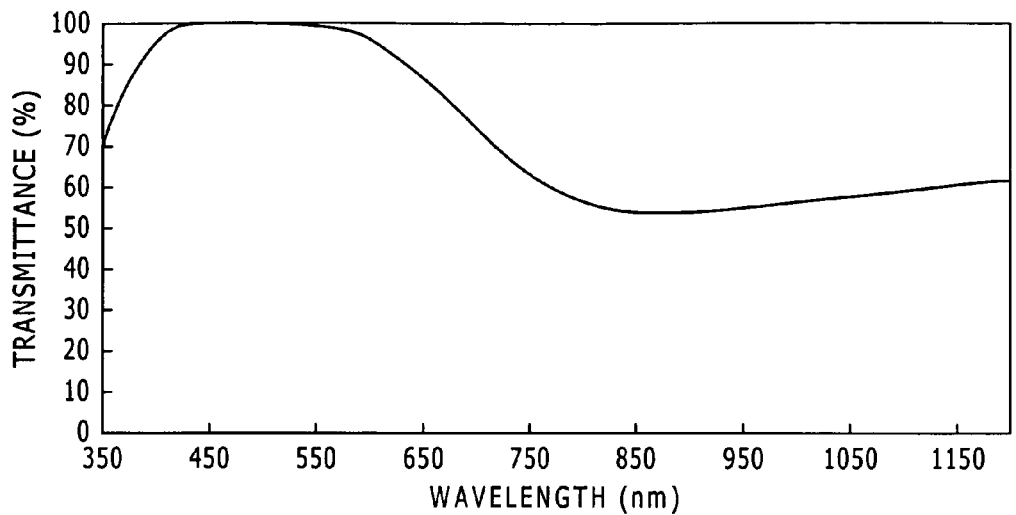
F I G . 8
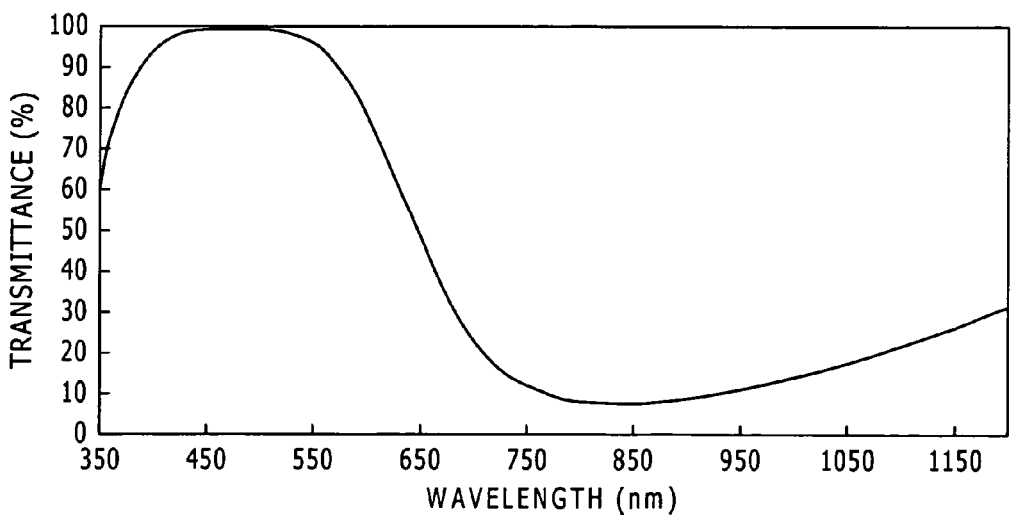

IMAGE TAKING OPTICAL SYSTEM AND IMAGE TAKING APPARATUS

CROSS-REFERENCE TO RELATED APPLICATION

The present application claims priority from Japanese Patent Application No. JP 2009-229577 filed in the Japanese Patent Office on Oct. 1, 2009, the entire content of which is incorporated herein by reference.

BACKGROUND OF THE INVENTION

1. Field of the Invention

The present invention relates to an image taking optical system and an image taking apparatus. To put it in detail, the present invention relates to a technical field of typically improving the quality of images by adjusting the spectroscopic characteristic of light incident on an image taking device by making use of a first infrared-ray absorption filter, a multi-layer film and a second infrared ray absorption filter which are provided on an optical path.

2. Description of the Related Art

In recent years, there is a rising demand for quality improvement of image taking apparatus such as digital video cameras and digital still cameras and for downsizing of the image taking apparatus. In order to meet this demand, a high-density CCD (Charge Coupled Device) and/or a high-density CMOS (Complementary Metal-Oxide Semiconductor) device are used as a solid-state image taking device employed in the image taking apparatus and, on top of that, there has been proposed means for typically reducing the size of the image taking optical system.

There are a number of known technologies for improving the resolution of an image taking optical system in order to raise the quality of images in an image taking apparatus employing such a solid-state image taking device.

In order to raise the quality of images, however, it is very important to provide means for assuring good color reproducibility of an image and/or a video as means separated from the improvement of the resolution.

In general, an image taking apparatus employs an optical filter such as an infrared-ray absorption filter and components including lenses. The optical filter and the components including lenses are provided on an optical path, forming an image taking optical system (For example, Japanese Patent Laid-open No. 2006-220873). Thus, in order to implement the ideal color reproducibility, it is necessary to properly adjust the spectroscopic characteristic of the optical filter such as an infrared-ray absorption filter.

In addition, with the reduction of the sizes of the image taking optical system and/or the lens unit, light is reflected by optical members composing the lens unit and members (including a multi-layer film) composing the image taking optical system, becoming stray light. If the stray light hits the image taking device, the color reproducibility deteriorates with ease.

Thus, in order to implement both the improvement of the quality of images and the size reduction, it is important to reduce the amount of stray light incident on the image taking device by preventing the stray light from being generated.

SUMMARY OF THE INVENTION

By the way, in the past, the improvement of the quality of images has not been implemented sufficiently. In general, the quality of images is improved by preventing the stray light from being generated due to the size reduction.

An image taking optical system and an image taking apparatus which are provided in accordance with the embodiments of the present invention should allow the size to be reduced and the quality of images to be improved and are yet capable of solving the problems described above.

In order to solve the problems described above, there is provided an image taking optical system employing:
at least one lens provided on an optical path;
a first infrared-ray absorption filter made from a resin material with a film shape and provided on the optical path;
a multi-layer film provided with an infrared-ray absorption function and provided on the optical path; and
a second infrared-ray absorption filter made from a resin material with a film shape and provided on the optical path,
wherein:
the first infrared-ray absorption filter, the multi-layer film and the second infrared-ray absorption filter are provided at locations arranged along the optical path in a direction from a photographing-object side to an image side; and
the multi-layer film has a spectroscopic-characteristic adjustment function and a light reflection characteristic.

In addition, the image taking optical system satisfies conditions (1) to (4) given as follows:

$$0.84 < R1/R2 < 1.2 \tag{1}$$

$$0.8 < \lambda1/\lambda2 < 1.25 \tag{2}$$

$$T2/T1 < 1.0 \tag{3}$$

$$T3/T4 < 0.05 \tag{4}$$

where:
reference notation R1 denotes an average reflectance exhibited by the multi-layer film for light having a wavelength in the range 680 nm to 780 nm, passing through the first infrared-ray absorption filter from the photographing-object side to be reflected by the multi-layer film and passing through the first infrared-ray absorption filter from the image side;
reference notation R2 denotes an average reflectance exhibited by the multi-layer film for light having a wavelength in the range 680 nm to 780 nm, passing through the second infrared-ray absorption filter from the image side to be reflected by the multi-layer film and passing through the second infrared-ray absorption filter from the photographing-object side;
reference notation $\lambda1$ denotes the value of a wavelength for which a transmittance exhibited by the first infrared-ray absorption filter for light having a wavelength at least equal to 550 nm becomes equal to 70%;
reference notation $\lambda2$ denotes the value of a wavelength for which a transmittance exhibited by the second infrared-ray absorption filter for light having a wavelength at least equal to 550 nm becomes equal to 70%;
reference notation T1 denotes an average transmittance exhibited by a combination of the first infrared-ray absorption filter and the second infrared-ray absorption filter for light having a wavelength in the range 700 nm to 725 nm;
reference notation T2 denotes an average transmittance exhibited by the multi-layer film for light having a wavelength in the range 700 nm to 725 nm;
reference notation T3 denotes a transmittance exhibited by a combination of the first infrared-ray absorption filter, the multi-layer film and the second infrared-ray absorption filter for light having a wavelength of 700 nm; and reference notation T4 denotes a transmittance exhibited by the combination of the first infrared-ray absorption filter, the multi-layer film and the second infrared-ray absorption filter for light having a wavelength of 540 nm.

Thus, in the image taking optical system, the first infrared-ray absorption filter, the multi-layer film and the second infrared-ray absorption filter absorb light components harmful to generation of an image and/or a video and reduce the harmful light components incident on the image taking device.

It is desirable to provide the image taking optical system described above with a configuration in which condition (5) given below is satisfied:

$$0.85 < \lambda 5/\lambda 6 \quad (5)$$

where:

reference notation λ5 denotes the value of a wavelength for which a transmittance exhibited by the combination of the first infrared-ray absorption filter, the multi-layer film and the second infrared-ray absorption filter for light having a wavelength not greater than 450 nm becomes equal to 80%; and reference notation λ6 denotes the value of a wavelength for which a transmittance exhibited by the combination of the first infrared-ray absorption filter, the multi-layer film and the second infrared-ray absorption filter for light having a wavelength not greater than 450 nm becomes equal to 20%.

With condition (5) satisfied, due to an ultraviolet-ray absorption effect, it is possible to suppress generation of reflected harmful light on the small-wavelength side.

It is desirable to provide the image taking optical system described above with a configuration in which the optical-axis direction thickness of each of the first infrared-ray absorption filter and the second infrared-ray absorption filter is not smaller than 10 μm and not greater than 120 μm.

By setting the optical-axis direction thickness of each of the first infrared-ray absorption filter and the second infrared-ray absorption filter at a value which is not smaller than 10 μm and not greater than 120 μm, it is possible to reduce the length of the optical path and a space occupied by each of the first infrared-ray absorption filter and the second infrared-ray absorption filter.

it is desirable to provide the image taking optical system described above with a configuration in which the multi-layer film is created on a glass substrate.

By creating the multi-layer film on a glass substrate, it is possible to reduce a difference in linear expansion coefficient between the multi-layer film and the glass substrate.

It is desirable to provide the image taking optical system described above with a configuration in which the multi-layer film is created on the first infrared-ray absorption filter or the second infrared-ray absorption filter.

By creating the multi-layer film on the first infrared-ray absorption filter or the second infrared-ray absorption filter, the glass substrate becomes unnecessary.

It is desirable to provide the image taking optical system described above with a configuration in which an air layer is created at least between the first infrared-ray absorption filter and the multi-layer film or between the multi-layer film and the second infrared-ray absorption filter.

By creating the air layer at least between the first infrared-ray absorption filter and the multi-layer film or between the multi-layer film and the second infrared-ray absorption filter, it is possible to prevent the first infrared-ray absorption filter or the second infrared-ray absorption filter from expanding or contracting.

It is desirable to provide the image taking optical system described above with a configuration in which the first infrared-ray absorption filter, the multi-layer film and the second infrared-ray absorption filter are provided at locations adhering closely to each other in the optical-axis direction.

By providing the first infrared-ray absorption filter, the multi-layer film and the second infrared-ray absorption filter at locations adhering closely to each other in the optical-axis direction, an air layer does not exist between the first infrared-ray absorption filter and the multi-layer film and between the multi-layer film and the second infrared-ray absorption filter.

It is desirable to provide the image taking optical system described above with a configuration in which the first infrared-ray absorption filter, the multi-layer film and the second infrared-ray absorption filter are provided on the optical path at locations between the lens closest to the image side and the image taking device.

By providing the first infrared-ray absorption filter, the multi-layer film and the second infrared-ray absorption filter on the optical path at locations between the lens closest to the image side and the image taking device, it is possible to reduce effects of aberrations caused by surface precisions of the first infrared-ray absorption filter, the multi-layer film and the second infrared-ray absorption filter on the quality of images.

It is desirable to provide the image taking optical system described above with a configuration in which the basic material of each of the first infrared-ray absorption filter and the second infrared-ray absorption filter is created from a cyclic olefinic resin.

By creating the basic material of each of the first infrared-ray absorption filter and the second infrared-ray absorption filter from a cyclic olefinic resin, it is possible to provide each of the first infrared-ray absorption filter and the second infrared-ray absorption filter with the characteristic of the cyclic olefinic resin.

It is desirable to provide the image taking optical system described above with a configuration in which the basic material of each of the first infrared-ray absorption filter and the second infrared-ray absorption filter includes a coloring agent exhibiting an infrared-ray absorption effect and an organic pigment of at least one type is used as the coloring agent.

By including a coloring agent exhibiting an infrared-ray absorption effect in each of the first infrared-ray absorption filter and the second infrared-ray absorption filter and making use of an organic pigment of at least one type as the coloring agent, it is possible to reduce the quantity of an inorganic pigment used in the coloring agent.

In order to solve the problems described above, there is provided an image taking apparatus employing an image taking optical system and an image taking device for converting an optical image created by the image taking optical system into an electrical signal wherein:

the image taking optical system has:

at least one lens provided on an optical path;

a first infrared-ray absorption filter made from a resin material with a film shape and provided on the optical path;

a multi-layer film provided with an infrared-ray absorption function and provided on the optical path; and a second infrared-ray absorption filter made from a resin material with a film shape and provided on the optical path;

the first infrared-ray absorption filter, the multi-layer film and the second infrared-ray absorption filter are provided at locations arranged along the optical path in a direction from a photographing-object side to an image side;

the multi-layer film has a spectroscopic-characteristic adjustment function and a light reflection characteristic; and the image taking optical system satisfies conditions (1) to (4) given as follows:

$$0.84 < R1/R2 < 1.2 \quad (1)$$

$$0.8 < \lambda1/\lambda2 < 1.25 \quad (2)$$

$$T2/T1 < 1.0 \quad (3)$$

$$T3/T4 < 0.05 \quad (4)$$

where:

reference notation R1 denotes an average reflectance exhibited by the multi-layer film for light having a wavelength in the range 680 nm to 780 nm, passing through the first infrared-ray absorption filter from the photographing-object side to be reflected by the multi-layer film and passing through the first infrared-ray absorption filter from the image side;

reference notation R2 denotes an average reflectance exhibited by the multi-layer film for light having a wavelength in the range 680 nm to 780 nm, passing through the second infrared-ray absorption filter from the image side to be reflected by the multi-layer film and passing through the second infrared-ray absorption filter from the photographing-object side;

reference notation $\lambda1$ denotes the value of a wavelength for which a transmittance exhibited by the first infrared-ray absorption filter for light having a wavelength at least equal to 550 nm becomes equal to 70%;

reference notation $\lambda2$ denotes the value of a wavelength for which a transmittance exhibited by the second infrared-ray absorption filter for light having a wavelength at least equal to 550 nm becomes equal to 70%;

reference notation T1 denotes an average transmittance exhibited by a combination of the first infrared-ray absorption filter and the second infrared-ray absorption filter for light having a wavelength in the range 700 nm to 725 nm;

reference notation T2 denotes an average transmittance exhibited by the multi-layer film for light having a wavelength in the range 700 nm to 725 nm;

reference notation T3 denotes a transmittance exhibited by a combination of the first infrared-ray absorption filter, the multi-layer film and the second infrared-ray absorption filter for light having a wavelength of 700 nm; and reference notation T4 denotes a transmittance exhibited by the combination of the first infrared-ray absorption filter, the multi-layer film and the second infrared-ray absorption filter for light having a wavelength of 540 nm.

Thus, in the image taking optical system, the first infrared-ray absorption filter, the multi-layer film and the second infrared-ray absorption filter absorb light components harmful to generation of an image and/or a video and reduce the harmful light components incident on the image taking device.

As described above, an image taking optical system provided by the embodiments of the present invention employs:

at least one lens provided on an optical path;

a first infrared-ray absorption filter made from a resin material with a film shape and provided on the optical path;

a multi-layer film provided with an infrared-ray absorption function and provided on the optical path; and a second infrared-ray absorption filter made from a resin material with a film shape and provided on the optical path, wherein:

the first infrared-ray absorption filter, the multi-layer film and the second infrared-ray absorption filter are provided at locations arranged along the optical path in a direction from a photographing-object side to an image side; and the multi-layer film has a spectroscopic-characteristic adjustment function and a light reflection characteristic.

In addition, the image taking optical system satisfies conditions (1) to (4) given as follows:

$$0.84 < R1/R2 < 1.2 \quad (1)$$

$$0.8 < \lambda1/\lambda2 < 1.25 \quad (2)$$

$$T2/T1 < 1.0 \quad (3)$$

$$T3/T4 < 0.05 \quad (4)$$

where:

reference notation R1 denotes an average reflectance exhibited by the multi-layer film for light having a wavelength in the range 680 nm to 780 nm, passing through the first infrared-ray absorption filter from the photographing-object side to be reflected by the multi-layer film and passing through the first infrared-ray absorption filter from the image side;

reference notation R2 denotes an average reflectance exhibited by the multi-layer film for light having a wavelength in the range 680 nm to 780 nm, passing through the second infrared-ray absorption filter from the image side to be reflected by the multi-layer film and passing through the second infrared-ray absorption filter from the photographing-object side;

reference notation $\lambda1$ denotes the value of a wavelength for which a transmittance exhibited by the first infrared-ray absorption filter for light having a wavelength at least equal to 550 nm becomes equal to 70%;

reference notation $\lambda2$ denotes the value of a wavelength for which a transmittance exhibited by the second infrared-ray absorption filter for light having a wavelength at least equal to 550 nm becomes equal to 70%;

reference notation T1 denotes an average transmittance exhibited by a combination of the first infrared-ray absorption filter and the second infrared-ray absorption filter for light having a wavelength in the range 700 nm to 725 nm;

reference notation T2 denotes an average transmittance exhibited by the multi-layer film for light having a wavelength in the range 700 nm to 725 nm;

reference notation T3 denotes a transmittance exhibited by a combination of the first infrared-ray absorption filter, the multi-layer film and the second infrared-ray absorption filter for light having a wavelength of 700 nm; and reference notation T4 denotes a transmittance exhibited by the combination of the first infrared-ray absorption filter, the multi-layer film and the second infrared-ray absorption filter for light having a wavelength of 540 nm.

Thus, in the image taking optical system, the first infrared-ray absorption filter, the multi-layer film and the second infrared-ray absorption filter absorb light components harmful to generation of an image and/or a video and reduce the harmful light components incident on the image taking device.

In accordance with an embodiment, condition (5) given below is satisfied:

$$0.85 < \lambda5/\lambda6 \quad (5)$$

where:

reference notation $\lambda5$ denotes the value of a wavelength for which a transmittance exhibited by the combination of the first infrared-ray absorption filter, the multi-layer film and the second infrared-ray absorption filter for light having a wavelength not greater than 450 nm becomes equal to 80%; and reference notation $\lambda6$ denotes the value of a wavelength for which a transmittance exhibited by the combination of the first infrared-ray absorption filter, the multi-layer film and the second infrared-ray absorption filter for light having a wavelength not greater than 450 nm becomes equal to 20%.

Thus, due to an ultraviolet-ray absorption effect, it is possible to suppress generation of reflected harmful light on the small-wavelength side and improve the quality of images.

In accordance with an embodiment, the optical-axis direction thickness of each of the first infrared-ray absorption filter and the second infrared-ray absorption filter is not smaller than 10 μm and not greater than 120 μm.

It is thus possible to reduce the size of the image taking optical system.

In accordance with an embodiment, the multi-layer film is created on a glass substrate.

Thus, since the linear expansion coefficient of the glass substrate is close to the linear expansion coefficient of the multi-layer film, it is possible to prevent typically damages incurred by the multi-layer film due to temperatures during an operation carried out by the image taking apparatus which employs the image taking optical system.

In accordance with an embodiment, the multi-layer film is created on the first infrared-ray absorption filter or the second infrared-ray absorption filter.

Thus, the glass substrate becomes unnecessary. As a result, the size of the image taking optical system can be reduced.

In accordance with an embodiment, an air layer is created at least between the first infrared-ray absorption filter and the multi-layer film or between the multi-layer film and the second infrared-ray absorption filter.

It is thus possible to prevent deteriorations caused by the linear expansion coefficient of the first infrared-ray absorption filter or the second infrared-ray absorption filter itself.

In accordance with an embodiment, the first infrared-ray absorption filter, the multi-layer film and the second infrared-ray absorption filter are provided at locations adhering closely to each other in the optical-axis direction. Thus, the size of the image taking optical system can be further reduced.

In accordance with an embodiment, the first infrared-ray absorption filter, the multi-layer film and the second infrared-ray absorption filter are provided on the optical path at locations between the lens closest to the image side and the image taking device.

Thus, it is possible to reduce effects of aberrations caused by surface precisions of the first infrared-ray absorption filter, the multi-layer film and the second infrared-ray absorption filter on the quality of images. As a result, it is no longer necessary to create a structure for holding the first infrared-ray absorption filter, the multi-layer film and the second infrared-ray absorption filter with a high degree of precision.

In accordance with an embodiment, the basic material of each of the first infrared-ray absorption filter and the second infrared-ray absorption filter is created from a cyclic olefinic resin.

Thus, it is possible to provide the image taking optical system with a high transmittance, linear expansion coefficients proper for temperatures at which the image taking optical system is used and a low birefringence performance.

In accordance with an embodiment, the basic material of each of the first infrared-ray absorption filter and the second infrared-ray absorption filter includes a coloring agent exhibiting an infrared-ray absorption effect and an organic pigment of at least one type is used as the coloring agent.

Thus, it is possible to reduce the quantity of an inorganic pigment used in the coloring agent. As a result, it is possible to avoid image-quality deteriorations caused by typically generation of flares due to the size of particles.

As described above, an image taking apparatus provided by the embodiments of the present invention employs an image taking optical system and an image taking device for converting an optical image created by the image taking optical system into an electrical signal wherein:

the image taking optical system has:
at least one lens provided on an optical path;
a first infrared-ray absorption filter made from a resin material with a film shape and provided on the optical path;
a multi-layer film provided with an infrared-ray absorption function and provided on the optical path; and
a second infrared-ray absorption filter made from a resin material with a film shape and provided on the optical path;
the first infrared-ray absorption filter, the multi-layer film and the second infrared-ray absorption filter are provided at locations arranged along the optical path in a direction from a photographing-object side to an image side; and
the multi-layer film has a spectroscopic-characteristic adjustment function and a light reflection characteristic so that the image taking optical system satisfies conditions (1) to (4) given as follows:

$$0.84 < R1/R2 < 1.2 \tag{1}$$

$$0.8 < \lambda1/\lambda2 < 1.25 \tag{2}$$

$$T2/T1 < 1.0 \tag{3}$$

$$T3/T4 < 0.05 \tag{4}$$

where:
reference notation R1 denotes an average reflectance exhibited by the multi-layer film for light having a wavelength in the range 680 nm to 780 nm, passing through the first infrared-ray absorption filter from the photographing-object side to be reflected by the multi-layer film and passing through the first infrared-ray absorption filter from the image side;

reference notation R2 denotes an average reflectance exhibited by the multi-layer film for light having a wavelength in the range 680 nm to 780 nm, passing through the second infrared-ray absorption filter from the image side to be reflected by the multi-layer film and passing through the second infrared-ray absorption filter from the photographing-object side;

reference notation $\lambda1$ denotes the value of a wavelength for which a transmittance exhibited by the first infrared-ray absorption filter for light having a wavelength at least equal to 550 nm becomes equal to 70%;

reference notation $\lambda2$ denotes the value of a wavelength for which a transmittance exhibited by the second infrared-ray absorption filter for light having a wavelength at least equal to 550 nm becomes equal to 70%;

reference notation T1 denotes an average transmittance exhibited by a combination of the first infrared-ray absorption filter and the second infrared-ray absorption filter for light having a wavelength in the range 700 nm to 725 nm;

reference notation T2 denotes an average transmittance exhibited by the multi-layer film for light having a wavelength in the range 700 nm to 725 nm;

reference notation T3 denotes a transmittance exhibited by a combination of the first infrared-ray absorption filter, the multi-layer film and the second infrared-ray absorption filter for light having a wavelength of 700 nm; and reference notation T4 denotes a transmittance exhibited by the combination of the first infrared-ray absorption filter, the multi-layer film and the second infrared-ray absorption filter for light having a wavelength of 540 nm.

Thus, in the image taking optical system, the first infrared-ray absorption filter, the multi-layer film and the second infrared-ray absorption filter absorb light components harmful to generation of an image and/or a video and reduce the harmful light components incident on the image taking device. As a result, the size of the image taking apparatus can be reduced and the quality of images can be improved.

BRIEF DESCRIPTION OF THE DRAWINGS

FIGS. 7 to 10 are diagrams showing spectroscopic characteristics of an image taking optical system according to a first embodiment;

FIG. 7 is a diagram showing a graph representing a relation between the transmittance of a first infrared-ray absorption filter and the wavelength of light incident on the first infrared-ray absorption filter;

FIG. 8 is a diagram showing a graph representing a relation between the transmittance of a second infrared-ray absorption filter and the wavelength of light incident on the second infrared-ray absorption filter;

FIG. 9 is a diagram showing a graph representing a relation between the transmittance of a multi-layer film and the wavelength of light incident on the multi-layer film;

FIG. 10 is a diagram showing a graph representing a relation between the transmittance of a combination of the first infrared-ray absorption filter, the multi-layer film and the second infrared-ray absorption filter and the wavelength of light passing through the combination;

FIG. 11 is a diagram showing a graph representing a relation between the transmittance of a first infrared-ray absorption filter and the wavelength of light incident on the first infrared-ray absorption filter;

FIG. 12 is a diagram showing a graph representing a relation between the transmittance of a second infrared-ray absorption filter and the wavelength of light incident on the second infrared-ray absorption filter;

FIG. 13 is a diagram showing a graph representing a relation between the transmittance of a multi-layer film and the wavelength of light incident on the multi-layer film;

FIG. 14 is a diagram showing a graph representing a relation between the transmittance of a combination of the first infrared-ray absorption filter, the multi-layer film and the second infrared-ray absorption filter and the wavelength of light passing through the combination;

FIG. 15 is a diagram showing a graph representing a relation between the transmittance of a first infrared-ray absorption filter and the wavelength of light incident on the first infrared-ray absorption filter;

FIG. 16 is a diagram showing a graph representing a relation between the transmittance of a second infrared-ray absorption filter and the wavelength of light incident on the second infrared-ray absorption filter;

FIG. 17 is a diagram showing a graph representing a relation between the transmittance of a multi-layer film and the wavelength of light incident on the multi-layer film;

FIG. 18 is a diagram showing a graph representing a relation between the transmittance of a combination of the first infrared-ray absorption filter, the multi-layer film and the second infrared-ray absorption filter and the wavelength of light passing through the combination.

DETAILED DESCRIPTION OF THE PREFERRED EMBODIMENTS

By referring to diagrams, the following description explains preferred embodiments implementing an image taking optical system and an image taking apparatus which are provided by the embodiments of the present invention.

Concept of the Invention

The concept of the present invention is explained by referring to diagrams of FIGS. 1 and 2 as follows.

Figure 1:
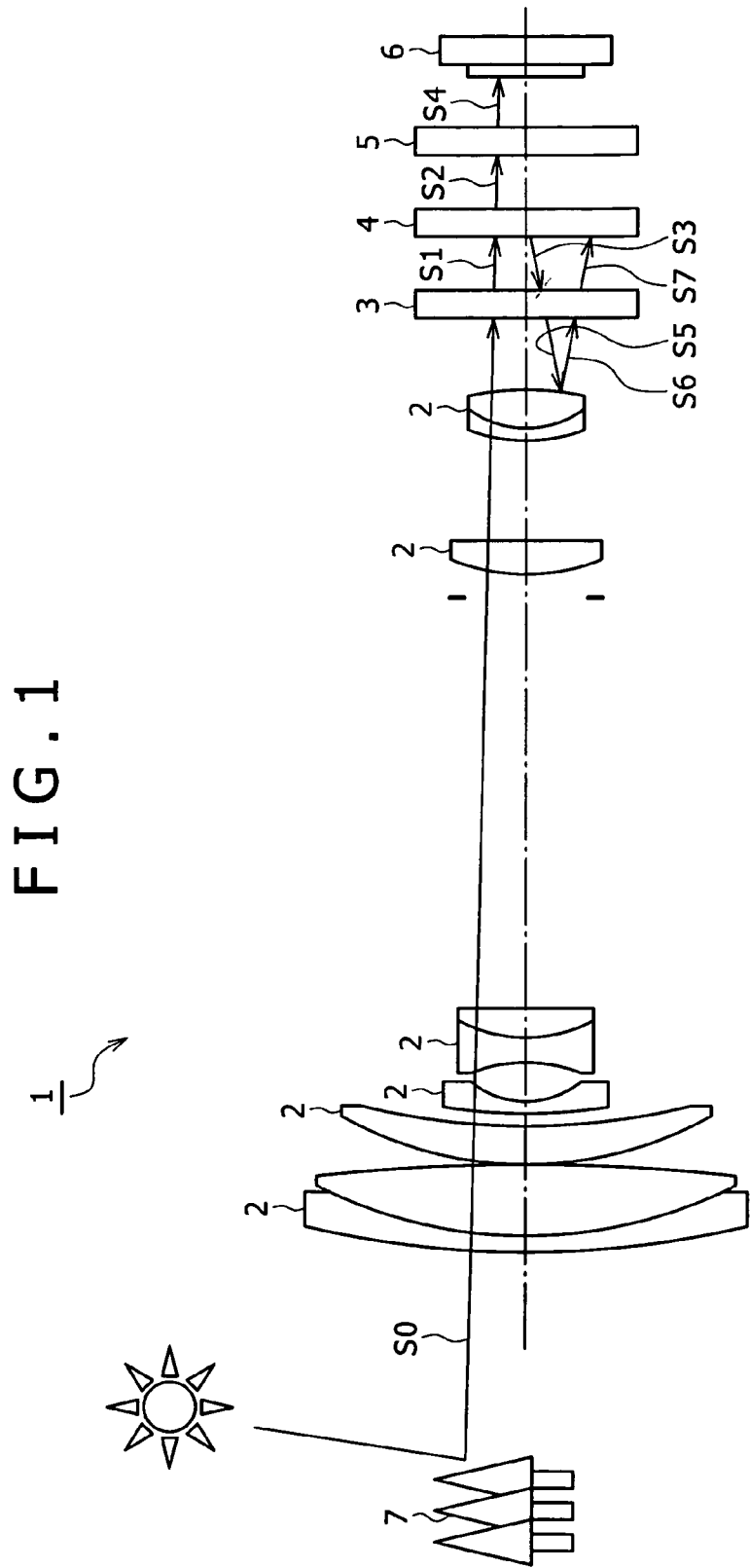
FIG. 1 is a conceptual diagram used in conjunction with a diagram of FIG. 2 to explain the concept of an image taking optical system provided by the embodiments of the present invention by showing optical paths of the entire image taking optical system.

As shown in the diagram of FIG. 1, an image taking optical system 1 employs a plurality of lenses 2, 2 and so on, a first infrared-ray absorption filter 3, a multi-layer film 4 and a second infrared-ray absorption filter 5. The lenses 2, 2 and so on, the first infrared-ray absorption filter 3, the multi-layer film 4 and the second infrared-ray absorption filter 5 are provided on the optical path of the image taking optical system 1.

An image taking device 6 such as a CCD or a CMOS device is provided at a location on the optical axis. The location at which the image taking device 6 is provided is a location closest to the image side.

The lenses 2, 2 and so on can be a single-body lens or a group consisting of a plurality of lenses.

The first infrared-ray absorption filter 3, the multi-layer film 4 and the second infrared-ray absorption filter 5 are provided at locations typically on the image side with respect to the lenses 2, 2 and so on. The locations at which the first infrared-ray absorption filter 3, the multi-layer film 4 and the second infrared-ray absorption filter 5 are provided are arranged along the optical path in a direction from the photographing-object side to the image side. Each of the first infrared-ray absorption filter 3 and the second infrared-ray absorption filter 5 is made from a resin material which has a film shape. The multi-layer film 4 has a function to absorb infrared rays, a function to adjust a spectroscopic characteristic and a property of reflecting light.

In a configuration like the one described above, when an incident luminous flux S0 reflected by a photographing object 7 hits the image taking optical system 1, the luminous flux S0 incident on the image taking optical system 1 is transmitted by the lenses 2, 2 and so on and arrives at the first infrared-ray absorption filter 3. The luminous flux S0 incident on the first infrared-ray absorption filter 3 is transmitted by the first infrared-ray absorption filter 3 as a transmitted luminous flux S1 propagating to the multi-layer film 4. When the luminous flux S0 is passing through the first infrared-ray absorption filter 3, the first infrared-ray absorption filter 3 absorbs at least some of light components harmful to generation of an image and/or a video from the luminous flux S0.

The transmitted luminous flux S1 propagating from the first infrared-ray absorption filter 3 is incident on the multi-layer film 4. The transmitted luminous flux S1 incident on the multi-layer film 4 is split by the multi-layer film 4 into a transmitted luminous flux S2 transmitted by the multi-layer film 4 and a reflected luminous flux S3 reflected by the multi-layer film 4. When the transmitted luminous flux S1 is passing through the multi-layer film 4, the multi-layer film 4 absorbs at least some of light components harmful to generation of an image and/or a video from the transmitted luminous flux S1.

The transmitted luminous flux S2 propagating from the multi-layer film 4 is incident on the second infrared-ray absorption filter 5 and transmitted by the second infrared-ray absorption filter 5 as a transmitted luminous flux S4 which is incident on the image taking device 6. When the transmitted luminous flux S2 is passing through the second infrared-ray absorption filter 5, the second infrared-ray absorption filter absorbs at least some of light components harmful to generation of an image and/or a video from the transmitted luminous flux S2.

In the mean time, the reflected luminous flux S3 reflected by the multi-layer film 4 is again incident on the first infrared-ray absorption filter 3 and transmitted by the first infrared-ray absorption filter 3 as a transmitted luminous flux S5 which propagates to the lenses 2, 2 and so on. When the reflected luminous flux S3 is passing through the first infrared-ray absorption filter 3, the first infrared-ray absorption filter 3 absorbs at least some of light components harmful to generation of an image and/or a video from the reflected luminous flux S3.

The transmitted luminous flux S5 propagating from the first infrared-ray absorption filter 3 is reflected by the lenses 2, 2 and so on as a reflected luminous flux S6 which is again incident on the first infrared-ray absorption filter 3. When the reflected luminous flux S6 is passing through the first infrared-ray absorption filter 3, the first infrared-ray absorption filter 3 absorbs at least some of light components harmful to generation of an image and/or a video from the reflected luminous flux S6.

(The reflected luminous flux S6 is transmitted by the first infrared-ray absorption filter 3 as a transmitted luminous flux S7). The transmitted luminous flux S7 propagates to the multi-layer film 4 to be transmitted and reflected in the same way as the transmitted luminous flux S1 which has been described above. In this way, the first infrared-ray absorption filter 3, the multi-layer film 4 or the second infrared-ray absorption filter 5 absorbs light components harmful to generation of an image and/or a video from a light flux which is passing through the first infrared-ray absorption filter 3, the multi-layer film 4 or the second infrared-ray absorption filter 5 respectively.

Figure 2:
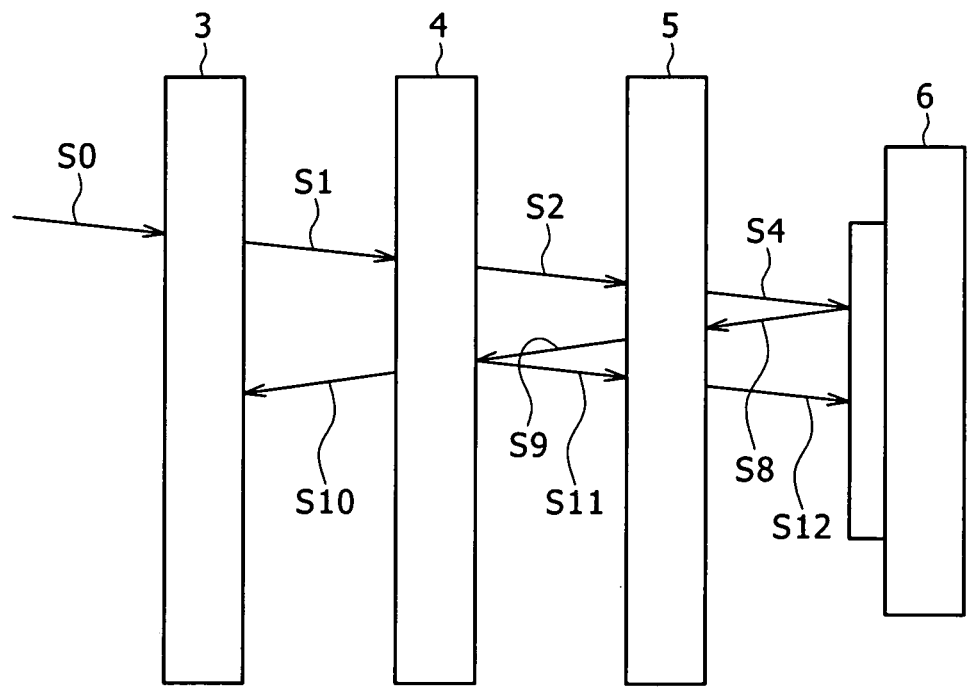
FIG. 2 is a conceptual diagram showing paths of light reflected by an image taking device.

In the mean time, as shown in a diagram of FIG. 2, some of the transmitted luminous flux S4 propagating from the second infrared-ray absorption filter 5 to the image taking device 6 is reflected by the image taking device 6 as a reflected luminous flux S8 which propagates back to the second infrared-ray absorption filter 5.

The reflected luminous flux S8 propagating from the image taking device 6 is again incident on the second infrared-ray absorption filter 5 to be passed on by the second infrared-ray absorption filter 5 as a transmitted luminous flux S9 which propagates to the multi-layer film 4. When the reflected luminous flux S8 is passing through the second infrared-ray absorption filter 5, the second infrared-ray absorption filter 5 absorbs at least some of light components harmful to generation of an image and/or a video from the reflected luminous flux S8.

The transmitted luminous flux S9 incident on the multi-layer film 4 is split by the multi-layer film 4 into a transmitted luminous flux S10 transmitted by the multi-layer film 4 and a reflected luminous flux S11 reflected by the multi-layer film 4. When the transmitted luminous flux S9 is passing through the multi-layer film 4, the multi-layer film 4 absorbs at least some of light components harmful to generation of an image and/or a video from the transmitted luminous flux S9.

The transmitted luminous flux S10 propagates to the first infrared-ray absorption filter 3 in the same way as the reflected luminous flux S3 which has been described earlier.

The reflected luminous flux S11 is again incident on the second infrared-ray absorption filter 5 to be transmitted by the second infrared-ray absorption filter 5 to the image taking device 6 as a transmitted luminous flux S12. When the reflected luminous flux S11 is passing through the second infrared-ray absorption filter 5, the second infrared-ray absorption filter 5 absorbs at least some of light components harmful to generation of an image and/or a video from the reflected luminous flux S11.

The transmitted luminous flux S12 propagating to the image taking device 6 is incident on the image taking device 6 and reflected by the image taking device 6 in the same way as what has been described before. In this way, the first infrared-ray absorption filter 3, the multi-layer film 4 or the second infrared-ray absorption filter 5 absorbs light components harmful to generation of an image and/or a video from a light flux which is passing through the first infrared-ray absorption filter 3, the multi-layer film 4 or the second infrared-ray absorption filter 5 respectively.

As described above, the image taking optical system provided by the embodiments of the present invention is configured to employ the first infrared-ray absorption filter 3, the multi-layer film 4 and the second infrared-ray absorption filter 5 which are used for absorbing light components harmful to generation of an image and/or a video from light fluxes passing through the first infrared-ray absorption filter 3, the multi-layer film 4 and the second infrared-ray absorption filter 5 respectively. The embodiments of the present invention optimize the adjustment of the spectroscopic characteristics in such a way that the first infrared-ray absorption filter 3, the multi-layer film 4 and the second infrared-ray absorption filter 5 transmit light components useful for generation of an image and/or a video to the image taking device 6 without absorbing the useful light components from light fluxes passing through the first infrared-ray absorption filter 3, the multi-layer film 4 and the second infrared-ray absorption filter 5 respectively.

Typical Configurations of the Infrared-Ray Absorption Filters and the Multi-Layer Film Next, typical configurations of the first infrared-ray absorption filter 3, the multi-layer film 4 and the second infrared-ray absorption filter 5 are explained by referring to diagrams of FIGS. 3 to 6.

Each of the first infrared-ray absorption filter 3 and the second infrared-ray absorption filter 5 is made from a resin material which has a film shape.

The multi-layer film 4 is created from an oxidized metal such as Ti, Si, Nb, Ta or La. The multi-layer film 4 is configured as a laminated stack of a number of functional layers which each have a function determined in advance. It is to be noted that each of the diagrams of FIGS. 3 to 6 shows the multi-layer film 4 by simplifying the functional layers. As a matter of fact, following description explains typical functional layers forming a laminated stack which consists of only an infrared-ray absorption layer and an ultraviolet-ray absorption layer.

Figure 3:
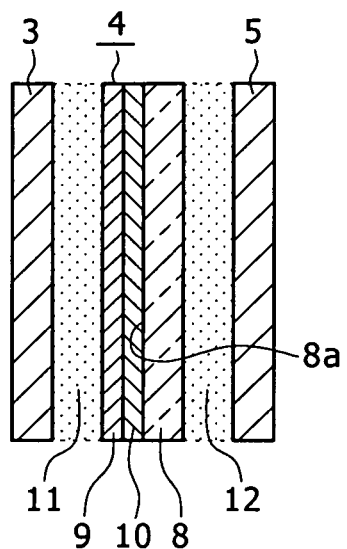
FIG. 3 is a model diagram showing a first typical configuration including a first infrared-ray absorption filter, a multi-layer film and a second infrared-ray absorption filter as is the case with FIGS. 4 to 6.

FIG. 3 is a diagram showing a first typical configuration of the first infrared-ray absorption filter 3, the multi-layer film 4 and the second infrared-ray absorption filter 5.

In the first typical configuration, the multi-layer film 4 is created to form a laminated stack of functional layers which include an ultraviolet-ray absorption layer 10 laid on a specific surface 8a of a glass substrate 8 and an infrared-ray absorption layer 9 laid on the ultraviolet-ray absorption layer 10. It is to be noted that the specific surface 8a is typically a surface which faces the photographing-object side. However, the specific surface 8a can also be a surface which faces the image side. In addition, in the case of the typical configuration shown in the diagram of FIG. 3, the infrared-ray absorption layer 9 is a functional layer on the photographing-object side whereas the ultraviolet-ray absorption layer 10 is a functional layer on the image side. It is to be noted, however, that the ultraviolet-ray absorption layer 10 can also be a functional layer on the photographing-object side whereas the infrared-ray absorption layer 9 is a functional layer on the image side.

In addition, an air layer 11 is created between the first infrared-ray absorption filter 3 and the multi-layer film 4 whereas an air layer 12 is created between the multi-layer film 4 and the second infrared-ray absorption filter 5.

Figure 4:
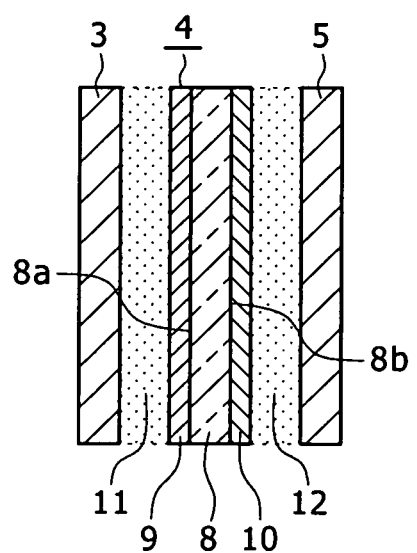
FIG. 4 is a model diagram showing a second typical configuration which includes a first infrared-ray absorption filter, a multi-layer film and a second infrared-ray absorption filter.

FIG. 4 is a diagram showing a second typical configuration of the first infrared-ray absorption filter 3, the multi-layer film 4 and the second infrared-ray absorption filter 5.

In the second typical configuration, the multi-layer film 4 is created to form a laminated stack of functional layers which include an infrared-ray absorption layer 9 laid on a specific surface 8a of a glass substrate 8 and an ultraviolet-ray absorption layer 10 laid on the other surface 8b of the glass substrate 8. It is to be noted, however, that the multi-layer film 4 can also be created to form a laminated stack of functional layers which include an ultraviolet-ray absorption layer 10 laid on a specific surface 8a of a glass substrate 8 and an infrared-ray absorption layer 9 laid on another surface 8b of the glass substrate 8.

In addition, an air layer 11 is created between the first infrared-ray absorption filter 3 and the multi-layer film 4 whereas an air layer 12 is created between the multi-layer film 4 and the second infrared-ray absorption filter 5.

As is obvious from the first and second typical configurations described above, the multi-layer film 4 is created on the glass substrate 8 to form a laminated stack of such functional layers that the linear expansion coefficient of each of the functional layers composing the multi-layer film 4 is close to the linear expansion coefficient of the glass substrate 8. Thus, it is possible to prevent typically damages incurred by the multi-layer film 4 due to temperatures during the operation carried out by an image taking apparatus which employs the image taking optical system 1.

Figure 5:
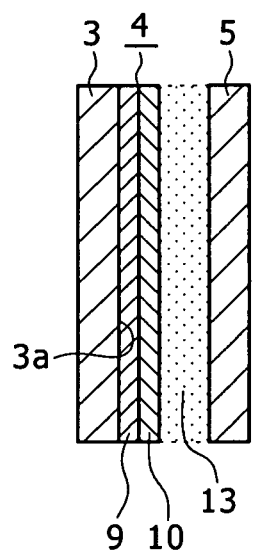
FIG. 5 is a model diagram showing a third typical configuration which includes a first infrared-ray absorption filter, a multi-layer film and a second infrared-ray absorption filter.

FIG. 5 is a diagram showing a third typical configuration of the first infrared-ray absorption filter 3, the multi-layer film 4 and the second infrared-ray absorption filter 5.

In the third typical configuration, the multi-layer film 4 is created to form a laminated stack of functional layers which include an infrared-ray absorption layer 9 laid on a specific surface 3a of the first infrared-ray absorption filter 3 and an ultraviolet-ray absorption layer 10 laid on the infrared-ray absorption layer 9. The specific surface 3a is a surface on the image side. It is to be noted that, as an alternative, the functional layers include an infrared-ray absorption layer 9 laid on a specific surface of the second infrared-ray absorption filter 5 and an ultraviolet-ray absorption layer 10 laid on the infrared-ray absorption layer 9. The specific surface of the second infrared-ray absorption filter 5 is a surface facing the first infrared-ray absorption filter 3 on the photographing-object side. As another alternative, the infrared-ray absorption layer 9 is laid on the surface on the image side whereas the ultraviolet-ray absorption layer 10 is laid on the surface on the photographing-object side or vice versa.

In addition, an air layer 13 is created between the multi-layer film 4 and the second infrared-ray absorption filter 5. It is to be noted that, as the alternative as described above, the functional layers form a laminated stack created on the specific surface of the second infrared-ray absorption filter 5 and the specific surface of the second infrared-ray absorption filter 5 is a surface facing the first infrared-ray absorption filter 3 on the photographing-object side. In this case, the air layer 13 is created between the multi-layer film 4 and the first infrared-ray absorption filter 3.

It is to be noted that, in the first, second and third typical configurations of the first infrared-ray absorption filter 3, the multi-layer film 4 and the second infrared-ray absorption filter 5, the thickness of each of the air layers 11, 12 and 13 can be changed if necessary. The thickness of an air layer is the distance in the optical-axis direction between the first infrared-ray absorption filter 3 and the multi-layer film 4 which sandwich the air layer or between the multi-layer film 4 and the second infrared-ray absorption filter 5 which sandwich the air layer.

As is obvious from the description of the third typical configuration, by creating the multi-layer film 4 on the first infrared-ray absorption filter 3 or the second infrared-ray absorption filter 5, the glass substrate 8 is no longer needed so that the size of the image taking optical system 1 can be reduced.

In addition, as is obvious from the descriptions of the first, second and third typical configurations, the air layer 11, the air layer 12 or the air layer 13 is created at least between the first infrared-ray absorption filter 3 and the multi-layer film 4 or between the multi-layer film 4 and the second infrared-ray absorption filter 5. It is thus possible to avoid deteriorations caused by the linear expansion coefficient of the first infrared-ray absorption filter 3 itself or the second infrared-ray absorption filter 5 itself.

Figure 6:
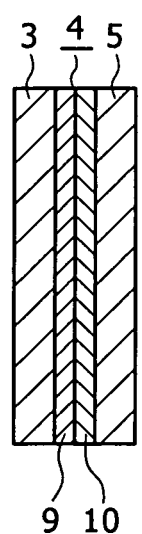
FIG. 6 is a model diagram showing a fourth typical configuration which includes a first infrared-ray absorption filter, a multi-layer film and a second infrared-ray absorption filter.

FIG. 6 is a diagram showing a fourth typical configuration of the first infrared-ray absorption filter 3, the multi-layer film 4 and the second infrared-ray absorption filter 5.

In the fourth typical configuration, the multi-layer film 4 is created between the first infrared-ray absorption filter 3 and the second infrared-ray absorption filter 5 to form a laminated stack of functional layers which are placed at positions closely adhering to each other. The multi-layer film 4 in the laminated stack includes an infrared-ray absorption layer 9 and an ultraviolet-ray absorption layer 10. Thus, an air layer does not exist between the first infrared-ray absorption filter 3 and the multi-layer film 4 and between the multi-layer film 4 and the second infrared-ray absorption filter 5.

As is obvious from the description of the fourth typical configuration, the first infrared-ray absorption filter 3, the multi-layer film 4 and the second infrared-ray absorption filter 5 are provided at positions adhering closely to each other in the optical-axis direction. Thus, the size of the image taking optical system 1 can be further reduced.

Configuration of the Image Taking Optical System

The image taking optical system employs at least one lens, a first infrared-ray absorption filter, a multi-layer film and a second infrared-ray absorption filter which are placed on the optical path of the system. The first infrared-ray absorption filter is made from a resin material with a film shape. The multi-layer film is provided with an infrared-ray absorption function. The second infrared-ray absorption filter is made also from a resin material with a film shape. The first infrared-ray absorption filter, the multi-layer film and the second infrared-ray absorption filter are provided at locations arranged along the optical path in a direction from a photographing-object side to an image side. The multi-layer film also has a spectroscopic-characteristic adjustment function and a light reflection characteristic.

By configuring the image taking optical system as described above, as explained before, the first infrared-ray absorption filter, the multi-layer film and the second infrared-ray absorption filter absorb light components harmful to generation of an image and/or a video, transmitting only light components required for reproduction of an image and/or a video as light components incident on the image taking device.

In addition, the image taking optical system provided by the embodiments of the present invention satisfies conditions (1) to (4) given as follows:

$$0.84 < R1/R2 < 1.2 \quad (1)$$

$$0.8 < \lambda1/\lambda2 < 1.25 \quad (2)$$

$$T2/T1 < 1.0 \quad (3)$$

$$T3/T4 < 0.05 \quad (4)$$

where:

reference notation R1 denotes an average reflectance exhibited by the multi-layer film for light having a wavelength in the range 680 nm to 780 nm, passing through the first infrared-ray absorption filter from the photographing-object side to be reflected by the multi-layer film and passing through the first infrared-ray absorption filter from the image side;

reference notation R2 denotes an average reflectance exhibited by the multi-layer film for light having a wavelength in the range 680 nm to 780 nm, passing through the second infrared-ray absorption filter from the image side to be reflected by the multi-layer film and passing through the second infrared-ray absorption filter from the photographing-object side;

reference notation $\lambda1$ denotes the value of a wavelength for which the transmittance exhibited by the first infrared-ray absorption filter for light having a wavelength at least equal to 550 nm becomes equal to 70%;

reference notation $\lambda2$ denotes the value of a wavelength for which the transmittance exhibited by the second infrared-ray absorption filter for light having a wavelength at least equal to 550 nm becomes equal to 70%;

reference notation T1 denotes an average transmittance exhibited by a combination of the first infrared-ray absorption filter and the second infrared-ray absorption filter for light having a wavelength in the range 700 nm to 725 nm;

reference notation T2 denotes an average transmittance exhibited by the multi-layer film for light having a wavelength in the range 700 nm to 725 nm;

reference notation T3 denotes a transmittance exhibited by the combination of the first infrared-ray absorption filter, the multi-layer film and the second infrared-ray absorption filter for light having a wavelength of 700 nm; and reference notation T4 denotes a transmittance exhibited by the combination of the first infrared-ray absorption filter, the multi-layer film and the second infrared-ray absorption filter for light having a wavelength of 540 nm.

Condition (1) is a condition for prescribing the balance between the reflectance of a specific surface of the multi-layer film and the reflectance of the other surface of the multi-layer film. On the other hand, condition (2) is a condition for prescribing the balance between the absorptance of the first infrared-ray absorption filter and the absorptance of the second infrared-ray absorption filter.

Light reflected by the multi-layer film to the first infrared-ray absorption filter includes harmful near-infrared light having wavelengths close to the range 680 nm to 780 nm. If the ratio R1/R2 of condition (1) becomes greater than the upper limit set for the condition and/or if the ratio $\lambda1/\lambda2$ of condition (2) becomes greater than the upper limit set for the condition, the quantity of the harmful near-infrared light inevitably rises.

As described above, light reflected by the multi-layer film to the first infrared-ray absorption filter includes harmful near-infrared light having wavelengths close to the range 680 nm to 780 nm. If the ratio R1/R2 of condition (1) conversely becomes smaller than the lower limit set for the condition and/or if the ratio $\lambda1/\lambda2$ of condition (2) conversely becomes smaller than the lower limit set for the condition, on the other hand, the quantity of the harmful near-infrared light also inevitably increases as well.

If the ratio R1/R2 of condition (1) becomes greater than the upper limit set for the condition, if the ratio $\lambda1/\lambda2$ of condition (2) becomes greater than the upper limit set for the condition, if the ratio R1/R2 of condition (1) becomes smaller than the lower limit set for the condition and/or if the ratio $\lambda1/\lambda2$ of condition (2) becomes smaller than the lower limit set for the condition as described above, the balance between the reflectance of the specific surface of the multi-layer film and the reflectance of the other surface of the multi-layer film or the balance between the absorptance of the first infrared-ray absorption filter and the absorptance of the second infrared-ray absorption filter collapses. Thus, stray light is emphasized. As a result, the quality of images unavoidably deteriorates.

Accordingly, if the image taking optical system satisfies conditions (1) and (2), the balance between the quantity of the harmful near-infrared light on the photographing-object side of the multi-layer film and the quantity of the harmful near-infrared light on the image side of the multi-layer film is put in an equilibrium state so that the quality of images can be improved.

Condition (3) is a condition for prescribing a relation between the average transmittance exhibited by a combination of the first infrared-ray absorption filter and the second infrared-ray absorption filter for light having wavelengths in the range 700 nm to 725 nm and the average transmittance exhibited by the multi-layer film for the same light. It is to be noted that the average transmittance exhibited by the combination of the first infrared-ray absorption filter and the second infrared-ray absorption filter for light having wavelengths in the range 700 nm to 725 nm as described above is defined as the average transmittance of light which has been passed through both the first infrared-ray absorption filter and the second infrared-ray absorption filter as light having wavelengths in the range 700 nm to 725 nm.

If the ratio T2/T1 of condition (3) becomes greater than the upper limit set for the condition, the first infrared-ray absorption filter becomes hardly capable of absorbing harmful light which has been reflected by the multi-layer film as light having wavelengths in the range 700 nm to 725 nm. Thus, it becomes difficult to reduce the quantity of harmful light incident on the image taking device.

Accordingly, if the image taking optical system satisfies condition (3), the first infrared-ray absorption filter becomes capable of absorbing harmful light which has been reflected by the multi-layer film as light having wavelengths in the range 700 nm to 725 nm. Thus, it becomes possible to reduce the quantity of harmful light incident on the image taking device.

Condition (4) is a condition which relates to a light transmittance exhibited by a combination of the first infrared-ray absorption filter, the multi-layer film and the second infrared-ray absorption filter. It is to be noted that the light transmittance exhibited by the combination of the first infrared-ray absorption filter, the multi-layer film and the second infrared-ray absorption filter as described above is defined as the transmittance of light which has passed through all the first infrared-ray absorption filter, the multi-layer film and the second infrared-ray absorption filter.

For small values of T4, the ratio T3/T4 of condition (4) becomes greater than the upper limit set for the condition. In this case, it becomes difficult to sufficiently assure the required quantity of light having wavelengths in the range 540 nm to 700 nm.

For large values of T3, on the other hand, the ratio T3/T4 of condition (4) also becomes greater than the upper limit set for the condition as well. In this case, the quantity of harmful near-infrared light increases so that the stray light is emphasized. Thus, the quality of images unavoidably deteriorates. In this case, if an attempt is made to compensate for the deteriorations of the image quality by carrying out signal processing such as adjustments in the image taking device, light in a visually unrecognizable region is undesirably emphasized so that it inevitably becomes difficult to assure proper color reproducibility.

Accordingly, if the image taking optical system satisfies condition (4), it becomes possible to sufficiently assure the required quantity of light having wavelengths in the range 540 nm to 700 nm. Thus, it also becomes possible to reduce the quantity of harmful near-infrared light. As a result, the quality of images can be improved.

As described above, in the image taking optical system according to the embodiments of the present invention, the multi-layer film having a function to adjust the spectroscopic characteristic of light is provided between the first infrared-ray absorption filter and the second infrared-ray absorption filter so that the image taking optical system satisfies conditions (1) to (4).

Thus, the first infrared-ray absorption filter, the multi-layer film and the second infrared-ray absorption filter absorb light components harmful to generation of an image and/or a video, reducing harmful light components incident on the image taking device. As a result, the quality of images can be improved.

In addition, the spectroscopic characteristic of light components harmful to generation of an image and/or a video and the luminance of the light components vary in accordance with electronic components placed on the photographing-object and image sides of the first infrared-ray absorption filter and the second infrared-ray absorption filter.

Thus, by determining the spectroscopic characteristics exhibited by the first infrared-ray absorption filter and the second infrared-ray absorption filter in accordance with the spectroscopic characteristic and the luminance, the spectroscopic characteristics exhibited by the first infrared-ray absorption filter and the second infrared-ray absorption filter can be optimized. As described above, the spectroscopic characteristic and the luminance are caused by the electronic components to serve as respectively the spectroscopic characteristic of light components, which are harmful to generation of an image and/or a video, and the luminance of the light components.

In addition, characteristics exhibited by a combination of the first infrared-ray absorption filter, the multi-layer film and the second infrared-ray absorption filter include characteristics of absorption and reflection for light having wavelengths in the range 400 nm to 1,200 nm. Thus, the spectroscopic intensity balance of light incident on the image taking device can be optimally adjusted. A typical example of the spectroscopic intensity balance is the light intensity balance among blue-color, green-color and red-color regions.

Accordingly, it is possible to well carry out the adjustment of the white balance between images and/or videos as well as color reproduction of the images and/or the videos. On top of that, it is also possible to prevent color noises from being generated due to execution of excessive electrical adjustment. As a result, it is possible to assure a light transmittance characteristic which optimizes the color reproduction of the images and/or the videos.

It is to be noted that, in an attempt made to reduce the size of the image taking optical system and the size of the image taking apparatus employing the image taking optical system, the transmittance (or the reflectance) of an incident light beam may change very abruptly in a wavelength region determined in advance or the quantity of stray light incident on the image taking device may change with ease.

Even with the reduced size of the image taking optical system and the reduced size of the image taking apparatus employing the image taking optical system, however, the image taking optical system can be configured to satisfy conditions (1) to (4) so that it is possible to effectively prevent the quantity of stray light from rising and improve the color reproduction of an image and/or a video. As a result, the quality of images can be much improved.

In the image taking optical system according to an embodiment of the present invention, it is desirable to satisfy condition (5) given below:

$$0.85 < \lambda 5 / \lambda 6 \quad (5)$$

In condition (5) given above, reference notation $\lambda 5$ denotes the value of a wavelength for which the transmittance exhibited by a combination of the first infrared-ray absorption filter, the multi-layer film and the second infrared-ray absorption filter for light having a wavelength not greater than 450 nm becomes equal to 80%; and reference notation $\lambda 6$ denotes the value of a wavelength for which the transmittance exhibited by the combination of the first infrared-ray absorption filter, the multi-layer film and the second infrared-ray absorption filter for light having a wavelength not greater than 450 nm becomes equal to 20%.

Condition (5) is a condition for prescribing the gradient angle of a spectroscopic waveform on the small-wavelength side of the multi-layer film.

If the ratio $\lambda 5/\lambda 6$ of condition (5) becomes smaller than the lower limit set for the condition, the reflectance on the small-wavelength side increases so that the quantity of harmful reflected light also rises. As a result, the quality of images undesirably deteriorates.

Thus, if the image taking optical system satisfies condition (5), it becomes possible to prevent harmful reflected light from being generated on the small-wavelength side due to an ultraviolet-ray absorption effect. As a result, the quality of images can be improved.

In the image taking optical system according to the embodiment of the present invention, it is desirable to set the optical-axis direction thickness of each of the first infrared-ray absorption filter and the second infrared-ray absorption filter at a value which is not smaller than 10 μm and not greater than 120 μm.

By setting the optical-axis direction thickness of each of the first infrared-ray absorption filter and the second infrared-ray absorption filter at a value not smaller than 10 μm and not greater than 120 μm, the size of the image taking optical system can be reduced. In particular, in the case of an image taking optical system allowing an optical filter having a function to absorb infrared light rays to be mounted onto the system and dismounted from the system in a low-illumination photographing operation, the weight of the movable section can be decreased due to weight reduction.

In addition, by setting the optical-axis direction thickness of each of the first infrared-ray absorption filter and the second infrared-ray absorption filter at a value not smaller than 10 μm, it is possible to hold each of the first infrared-ray absorption filter and the second infrared-ray absorption filter in a stable planar orientation.

In the image taking optical system according to the embodiment of the present invention, it is desirable to provide the first infrared-ray absorption filter, the multi-layer film and the second infrared-ray absorption filter at locations on the optical path between the lens closest to the image side and the image taking device.

By providing the first infrared-ray absorption filter, the multi-layer film and the second infrared-ray absorption filter at locations on the optical path between the lens closest to the image side and the image taking device, it is possible to reduce effects of aberrations caused by surface precisions of the first infrared-ray absorption filter, the multi-layer film and the second infrared-ray absorption filter on the quality of images. As a result, it is no longer necessary to create a structure for holding the first infrared-ray absorption filter, the multi-layer film and the second infrared-ray absorption filter with a high degree of precision.

In the image taking optical system according to the embodiment of the present invention, it is desirable to create the basic material of each of the first infrared-ray absorption filter and the second infrared-ray absorption filter from a cyclic olefinic resin.

By creating the basic material of each of the first infrared-ray absorption filter and the second infrared-ray absorption filter from a cyclic olefinic resin, it is possible to bring about a high transmittance, linear expansion coefficients proper for temperatures at which the image taking optical system is used and a low birefringence performance.

In the image taking optical system according to the embodiment of the present invention, it is desirable to include a coloring agent exhibiting an infrared-ray absorption effect in the basic material of each of the first infrared-ray absorption filter and the second infrared-ray absorption filter and to make use of an organic pigment of at least one type as the coloring agent.

By making use of an organic pigment of at least one type as a coloring agent, it is possible to reduce the quantity of an inorganic pigment utilized in the coloring agent. As a result, it is possible to avoid image-quality deteriorations caused by typically generation of flares due to the size of particles.

Typical Numerical Values Used in the Image Taking Optical System

By referring to a table and diagrams, the following description explains concrete embodiments which each implement an image taking optical system provided by the embodiments of the present invention as follows.

Table 1 shows numerical values of the ratios R1/R2, λ1/λ2, T2/T1, T3/T4 and λ5/λ6 used in respectively conditions (1) to (5) described before for image taking optical systems A, B and C according to first, second and third embodiments respectively.

TABLE 1

|  |  | Image taking optical system A | Image taking optical system B | Image taking optical system C |
|---|---|---|---|---|
| Condition (1) | R1/R2 | 1.02 | 1.00 | 1.00 |
| Condition (2) | λ1/λ2 | 1.17 | 1.00 | 1.11 |
| Condition (3) | T2/T1 | 0.29 | 0.33 | 0.34 |
| Condition (4) | T3/T4 | 0.01 | 0.003 | 0.001 |
| Condition (5) | λ5/λ6 | 0.99 | 0.99 | 0.98 |

As is obvious from Table 1, image taking optical system A, image taking optical system B and image taking optical system C each satisfy conditions (1) to (5).

Figure 9:
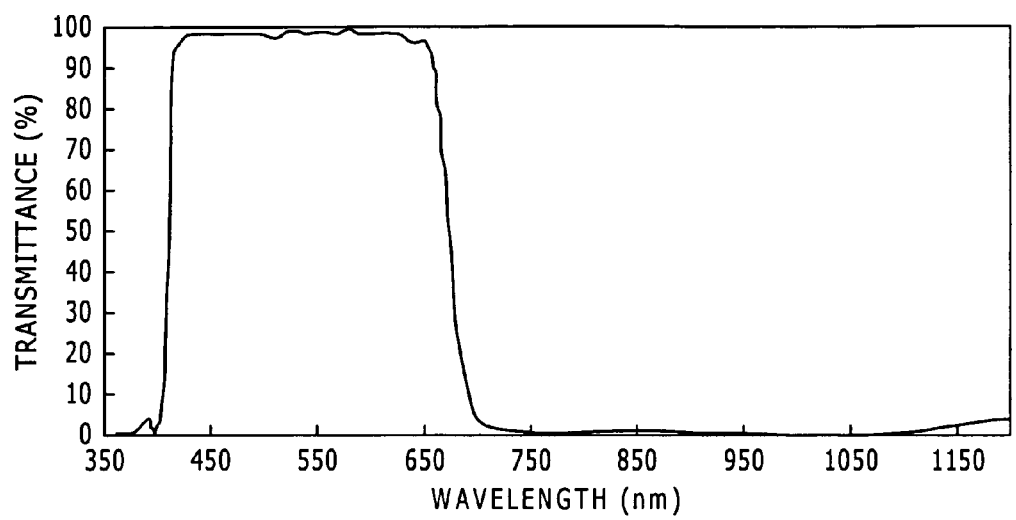
Figure 10:
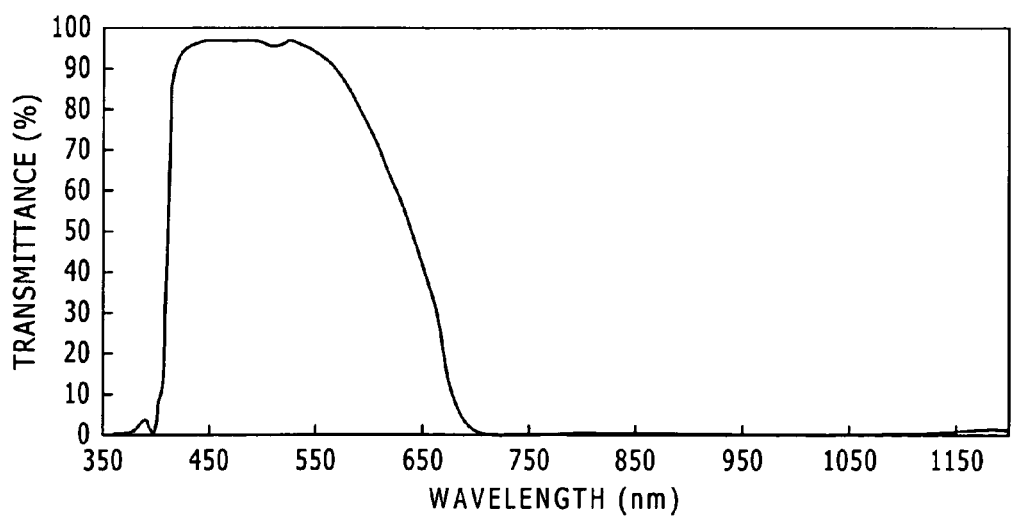

FIGS. 7 to 10 are each a diagram showing a graph representing a spectroscopic characteristic for image taking optical system A. To be more specific, FIG. 7 is a diagram showing the transmittance of the first infrared-ray absorption filter whereas FIG. 8 is a diagram showing the transmittance of the second infrared-ray absorption filter. On the other hand, FIG. 9 is a diagram showing the transmittance of the multi-layer film whereas FIG. 10 is a diagram showing the transmittance of a combination of the first infrared-ray absorption filter, the multi-layer film and the second infrared-ray absorption filter.

In image taking optical system A, as is obvious from FIG. 7 showing the transmittance of the first infrared-ray absorption filter and FIG. 8 showing the transmittance of the second infrared-ray absorption filter, transmittances in the near-infrared region are made low in comparison with transmittances on the side of wavelengths smaller than wavelengths in the near-infrared region. That is to say, image taking optical system A demonstrates a good light absorption effect in the near-infrared region. In addition, as is obvious from FIG. 9 showing the transmittance of the multi-layer film, the transmittance changes very abruptly over a wavelength region ranging from a wavelength of 650 nm to a wavelength of 700 nm and, as is obvious from FIG. 10 showing the transmittance of a combination of the first infrared-ray absorption filter, the multi-layer film and the second infrared-ray absorption filter, the transmittance changes gradually over a wavelength region ranging from a wavelength of 550 nm to a wavelength of 700 nm.

Thus, light components included in the near-infrared region as light components harmful to generation of an image and/or a video are absorbed so as to reduce such light components incident on the image taking device. At the same time, light components useful for generation of an image and/or a video hit the image taking device, improving the quality of images.

Figure 11:
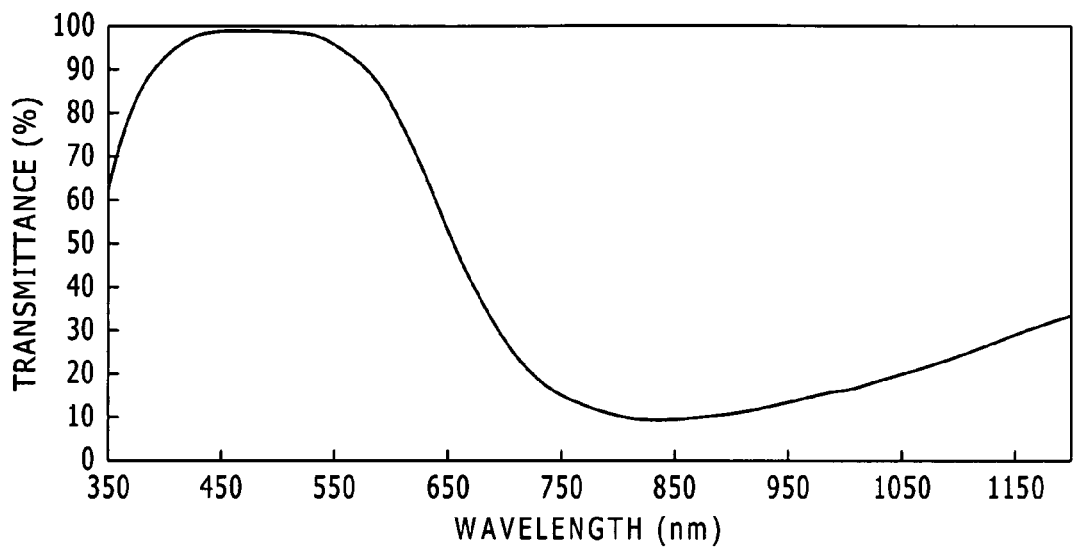
FIGS. 11 to 14 are diagrams showing spectroscopic characteristics of an image taking optical system according to a second embodiment.
Figure 12:
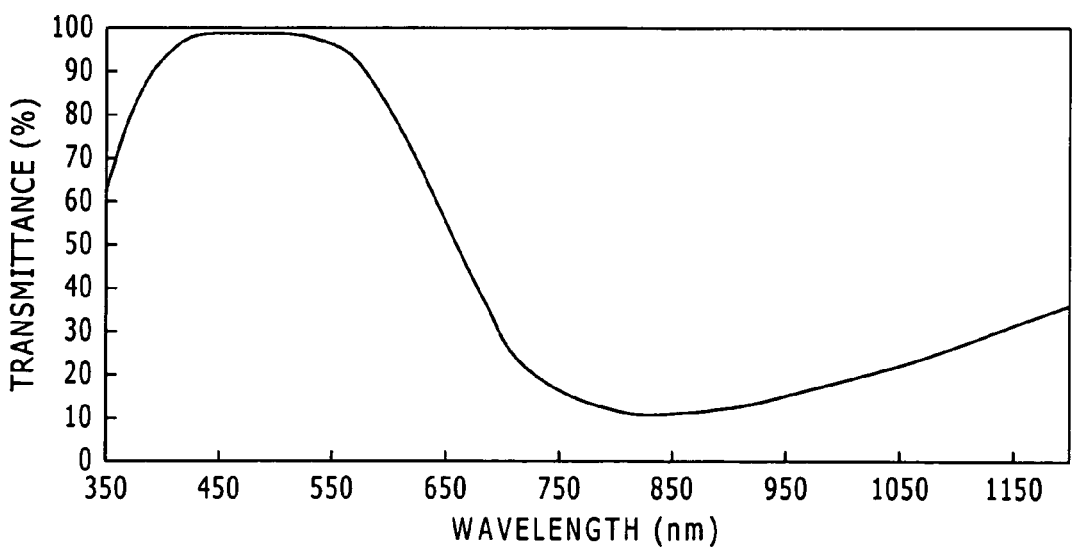
Figure 13:
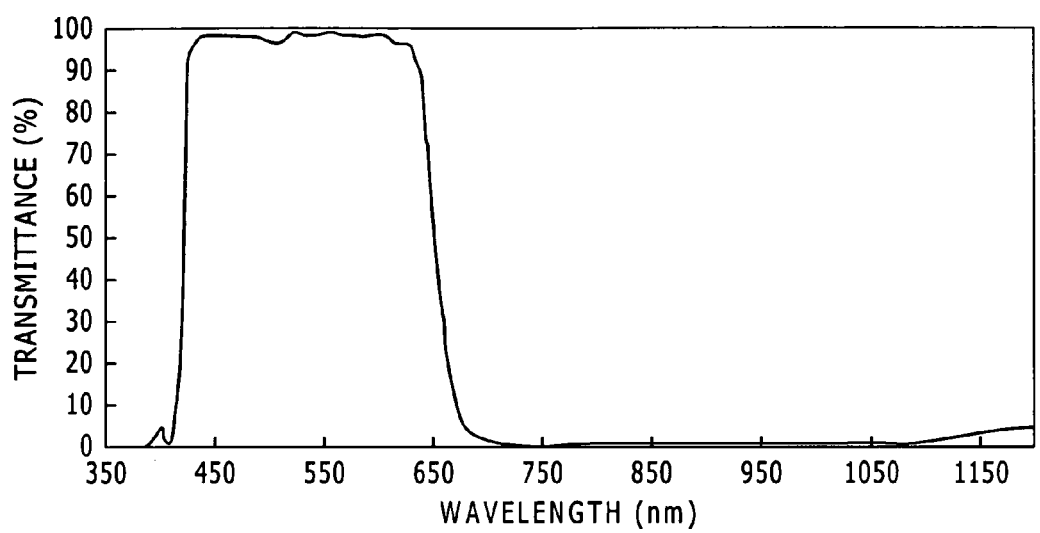
Figure 14:
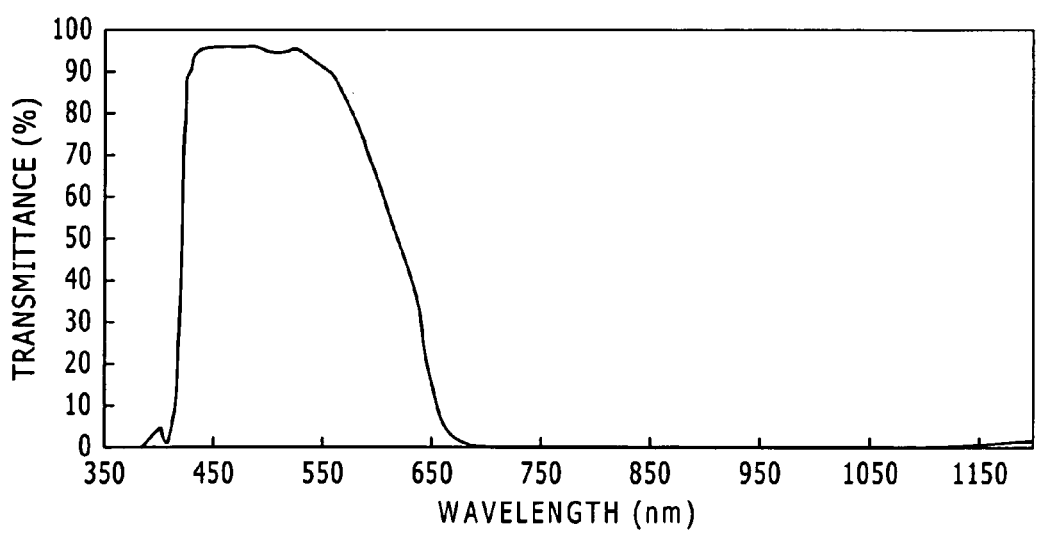

FIGS. 11 to 14 are each a diagram showing a graph representing a spectroscopic characteristic for image taking optical system B. To be more specific, FIG. 11 is a diagram showing the transmittance of the first infrared-ray absorption filter whereas FIG. 12 is a diagram showing the transmittance of the second infrared-ray absorption filter. On the other hand, FIG. 13 is a diagram showing the transmittance of the multi-layer film whereas FIG. 14 is a diagram showing the transmittance of a combination of the first infrared-ray absorption filter, the multi-layer film and the second infrared-ray absorption filter.

In image taking optical system B, as is obvious from FIG. 11 showing the transmittance of the first infrared-ray absorption filter of and FIG. 12 showing the transmittance of the second infrared-ray absorption filter, transmittances in the near-infrared region are made low in comparison with transmittances on the side of wavelengths smaller than wavelengths in the near-infrared region. That is to say, image taking optical system B demonstrates a good light absorption effect in the near-infrared region. In addition, as is obvious from FIG. 13 showing the transmittance of the multi-layer film, the transmittance changes very abruptly over a wavelength region ranging from a wavelength of 650 nm to a wavelength of 700 nm and, as is obvious from FIG. 14 showing the transmittance of a combination of the first infrared-ray absorption filter, the multi-layer film and the second infrared-ray absorption filter, the transmittance changes gradually over a wavelength region ranging from a wavelength of 550 nm to a wavelength of 700 nm.

Thus, light components included in the near-infrared region as light components harmful to generation of an image and/or a video are absorbed so as to reduce such light components incident on the image taking device. At the same time, light components useful for generation of an image and/or a video hit the image taking device, improving the quality of images.

Figure 15:
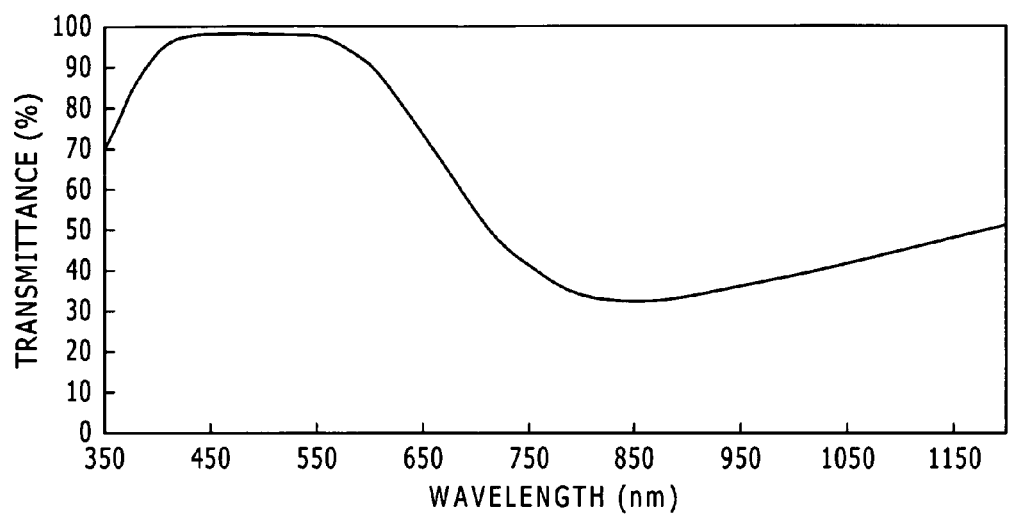
FIGS. 15 to 18 are diagrams showing spectroscopic characteristics of an image taking optical system according to a third embodiment.
Figure 16:
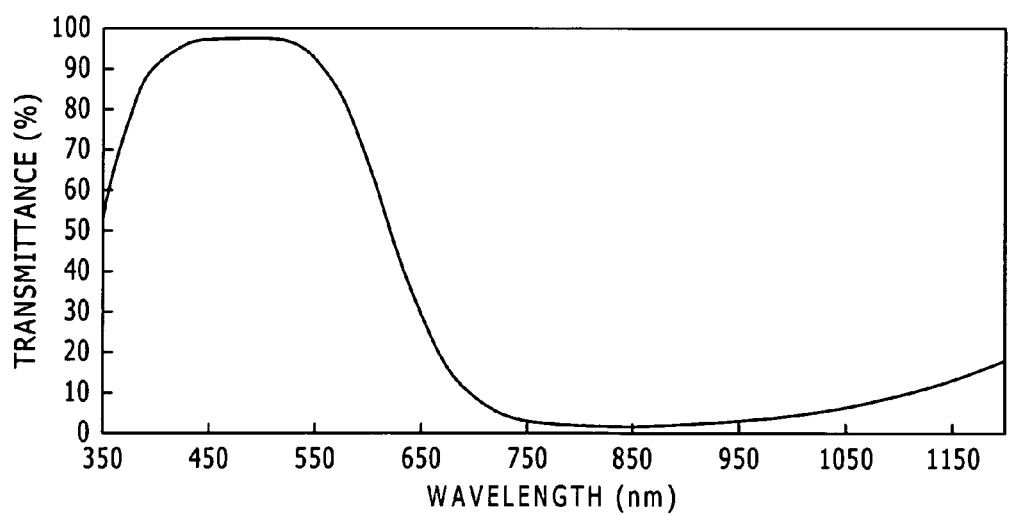
Figure 17:
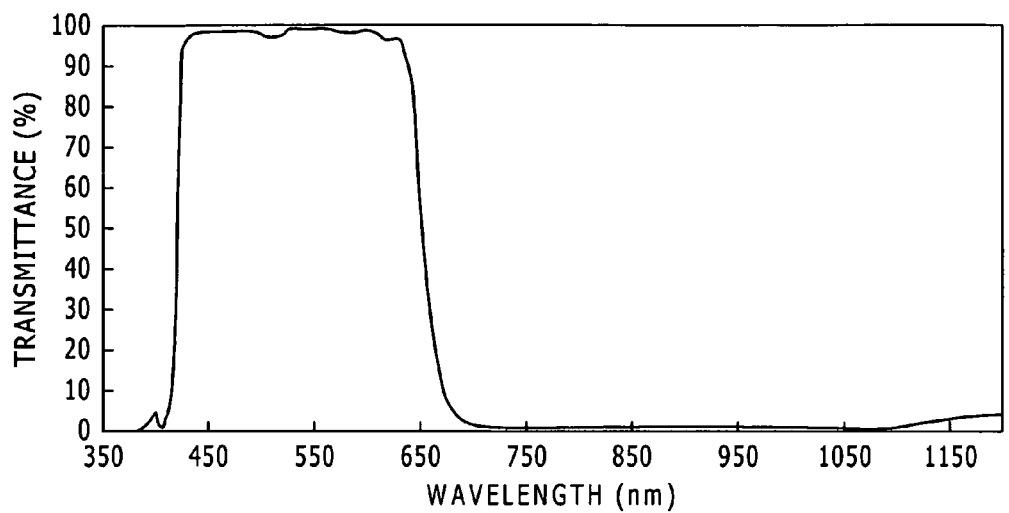
Figure 18:
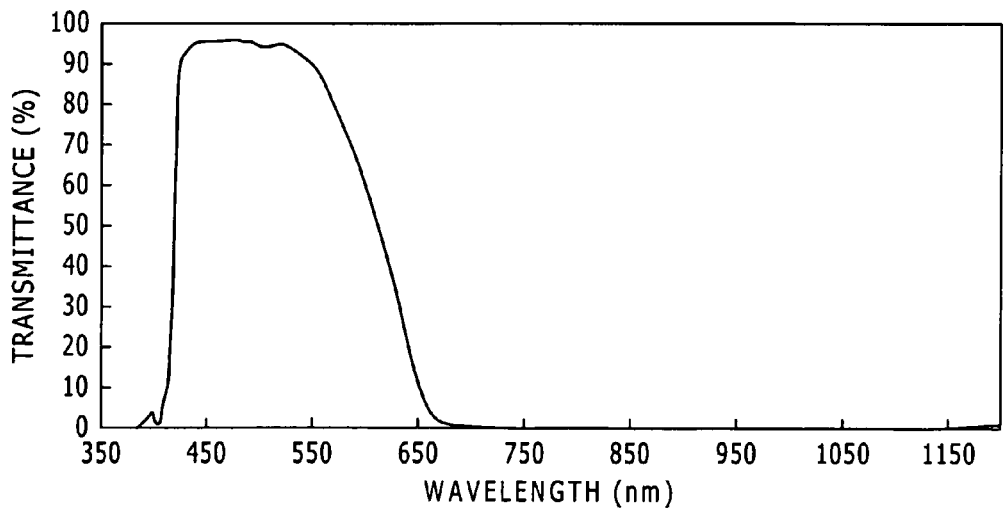

FIGS. 15 to 18 are each a diagram showing a graph representing a spectroscopic characteristic for image taking optical system C. To be more specific, FIG. 15 is a diagram showing the transmittance of the first infrared-ray absorption filter whereas FIG. 16 is a diagram showing the transmittance of the second infrared-ray absorption filter. On the other hand, FIG. 17 is a diagram showing the transmittance of the multi-layer film whereas FIG. 18 is a diagram showing the transmittance of a combination of the first infrared-ray absorption filter, the multi-layer film and the second infrared-ray absorption filter.

In image taking optical system C, as is obvious from FIG. 15 showing the transmittance of the first infrared-ray absorption filter of and FIG. 16 showing the transmittance of the second infrared-ray absorption filter, transmittances in the near-infrared region are made low in comparison with transmittances on the side of wavelengths smaller than wavelengths in the near-infrared region. That is to say, image taking optical system C demonstrates a good light absorption effect in the near-infrared region. In addition, as is obvious from FIG. 17 showing the transmittance of the multi-layer film, the transmittance changes very abruptly over a wavelength region ranging from a wavelength of 650 nm to a wavelength of 700 nm and, as is obvious from FIG. 18 showing the transmittance of a combination of the first infrared-ray absorption filter, the multi-layer film and the second infrared-ray absorption filter, the transmittance changes gradually over a wavelength region ranging from a wavelength of 550 nm to a wavelength of 700 nm.

Thus, light components included in the near-infrared region as light components harmful to generation of an image and/or a video are absorbed so as to reduce such light components incident on the image taking device. At the same time, light components useful for generation of an image and/or a video hit the image taking device, improving the quality of images.

Configuration of the Image Taking Apparatus

Next, an image taking apparatus provided by the embodiments of the present invention is explained as follows.

An image taking apparatus provided by the embodiments of the present invention employs an image taking optical system and an image taking device for converting an optical image created by the image taking optical system into an electrical signal.

The image taking optical system employed in the image taking apparatus provided by the embodiments of the present invention includes at least one lens, a first infrared-ray absorption filter, a multi-layer film and a second infrared-ray absorption filter which are placed on the optical path of the system. The first infrared-ray absorption filter is made from a resin material with a film shape. The multi-layer film is provided with an infrared-ray absorption function. The second infrared-ray absorption filter is made also from a resin material with a film shape. The first infrared-ray absorption filter, the multi-layer film and the second infrared-ray absorption filter are provided at locations arranged along the optical path in a direction from a photographing-object side to an image side. The multi-layer film also has a spectroscopic-characteristic adjustment function and a light reflection characteristic.

By configuring the image taking apparatus as described above, as explained before, the first infrared-ray absorption filter, the multi-layer film and the second infrared-ray absorption filter absorb light components harmful to generation of an image and/or a video, transmitting only light components required for reproduction of an image and/or a video as light components incident on the image taking device.

In addition, the image taking optical system employed in the image taking apparatus provided by the embodiments of the present invention satisfies conditions (1) to (4) given as follows:

$$0.84 < R1/R2 < 1.2 \quad (1)$$

$$0.8 < \lambda1/\lambda2 < 1.25 \quad (2)$$

$$T2/T1 < 1.0 \quad (3)$$

$$T3/T4 < 0.05 \quad (4)$$

where:

reference notation R1 denotes an average reflectance exhibited by the multi-layer film for light having a wavelength in the range 680 nm to 780 nm, passing through the first infrared-ray absorption filter from the photographing-object side to be reflected by the multi-layer film and passing through the first infrared-ray absorption filter from the image side;

reference notation R2 denotes an average reflectance exhibited by the multi-layer film for light having a wavelength in the range 680 nm to 780 nm, passing through the second infrared-ray absorption filter from the image side to be reflected by the multi-layer film and passing through the second infrared-ray absorption filter from the photographing-object side;

reference notation $\lambda1$ denotes the value of a wavelength for which the transmittance exhibited by the first infrared-ray absorption filter for light having a wavelength at least equal to 550 nm becomes equal to 70%;

reference notation $\lambda2$ denotes the value of a wavelength for which the transmittance exhibited by the second infrared-ray absorption filter for light having a wavelength at least equal to 550 nm becomes equal to 70%;

reference notation T1 denotes an average transmittance exhibited by a combination of the first infrared-ray absorption filter and the second infrared-ray absorption filter for light having a wavelength in the range 700 nm to 725 nm;

reference notation T2 denotes an average transmittance exhibited by the multi-layer film for light having a wavelength in the range 700 nm to 725 nm;

reference notation T3 denotes a transmittance exhibited by the combination of the first infrared-ray absorption filter, the multi-layer film and the second infrared-ray absorption filter for light having a wavelength of 700 nm; and reference notation T4 denotes a transmittance exhibited by the combination of the first infrared-ray absorption filter, the multi-layer film and the second infrared-ray absorption filter for light having a wavelength of 540 nm.

Condition (1) is a condition for prescribing the balance between the reflectance of a specific surface of the multi-layer film and the reflectance of the other surface of the multi-layer film. On the other hand, condition (2) is a condition for prescribing the balance between the absorptance of the first infrared-ray absorption filter and the absorptance of the second infrared-ray absorption filter.

Light reflected by the multi-layer film to the first infrared-ray absorption filter includes harmful near-infrared light having wavelengths close to the range 680 nm to 780 nm. If the ratio R1/R2 of condition (1) becomes greater than the upper limit set for the condition and/or if the ratio $\lambda 1/\lambda 2$ of condition (2) becomes greater than the upper limit set for the condition, the quantity of the harmful near-infrared light inevitably rises.

As described above, light reflected by the multi-layer film to the first infrared-ray absorption filter includes harmful near-infrared light having wavelengths close to the range 680 nm to 780 nm. If the ratio R1/R2 of condition (1) conversely becomes smaller than the lower limit set for the condition and/or if the ratio $\lambda 1/\lambda 2$ of condition (2) conversely becomes smaller than the lower limit set for the condition, on the other hand, the quantity of the harmful near-infrared light also inevitably increases as well.

If t the ratio R1/R2 of condition (1) becomes greater than the upper limit set for the condition, if the ratio $\lambda 1/\lambda 2$ of condition (2) becomes greater than the upper limit set for the condition, if the ratio R1/R2 of condition (1) becomes smaller than the lower limit set for the condition and/or if the ratio $\lambda 1/\lambda 2$ of condition (2) becomes smaller than the lower limit set for the condition as described above, the balance between the reflectance of the specific surface of the multi-layer film and the reflectance of the other surface of the multi-layer film or the balance between the absorptance of the first infrared-ray absorption filter and the absorptance of the second infrared-ray absorption filter collapses. Thus, stray light is emphasized. As a result, the quality of images unavoidably deteriorates.

Accordingly, if the image taking apparatus satisfies conditions (1) and (2), the balance between the quantity of the harmful near-infrared light on the photographing-object side of the multi-layer film and the quantity of the harmful near-infrared light on the image side of the multi-layer film is put in an equilibrium state so that the quality of images can be improved.

Condition (3) is a condition for prescribing a relation between the average transmittance exhibited by a combination of the first infrared-ray absorption filter and the second infrared-ray absorption filter for light having wavelengths in the range 700 nm to 725 nm and the average transmittance exhibited by the multi-layer film for the same light. It is to be noted that the average transmittance exhibited by the combination of the first infrared-ray absorption filter and the second infrared-ray absorption filter for light having wavelengths in the range 700 nm to 725 nm as described above is defined as the average transmittance of light which has been passed through both the first infrared-ray absorption filter and the second infrared-ray absorption filter as light having wavelengths in the range 700 nm to 725 nm.

If the ratio T2/T1 of condition (3) becomes greater than the upper limit set for the condition, the first infrared-ray absorption filter becomes hardly capable of absorbing harmful light which has been reflected by the multi-layer film as light having wavelengths in the range 700 nm to 725 nm. Thus, it becomes difficult to reduce the quantity of harmful light incident on the image taking device.

Accordingly, if the image taking apparatus satisfies condition (3), the first infrared-ray absorption filter becomes capable of absorbing harmful light which has been reflected by the multi-layer film as light having wavelengths in the range 700 nm to 725 nm. Thus, it becomes possible to reduce the quantity of harmful light incident on the image taking device.

Condition (4) is a condition which relates to a light transmittance exhibited by a combination of the first infrared-ray absorption filter, the multi-layer film and the second infrared-ray absorption filter. It is to be noted that the light transmittance exhibited by the combination of the first infrared-ray absorption filter, the multi-layer film and the second infrared-ray absorption filter as described above is defined as the transmittance of light which has passed through all the first infrared-ray absorption filter, the multi-layer film and the second infrared-ray absorption filter.

For small values of T4, the ratio T3/T4 of condition (4) becomes greater than the upper limit set for the condition. In this case, it becomes difficult to sufficiently assure the required quantity of light having wavelengths in the range 540 nm to 700 nm.

For large values of T3, on the other hand, the ratio T3/T4 of condition (4) also becomes greater than the upper limit, which is set for the condition, as well. In this case, the quantity of harmful near-infrared light increases so that the stray light is emphasized. Thus, the quality of images unavoidably deteriorates. In this case, if an attempt is made to compensate for the deteriorations of the image quantity by carrying out signal processing such as adjustments in the image taking device, light in a visually unrecognizable region is undesirably emphasized so that it inevitably becomes difficult to assure proper color reproducibility.

Accordingly, if the image taking apparatus satisfies condition (4), it becomes possible to sufficiently assure the required quantity of light having wavelengths in the range 540 nm to 700 nm. Thus, it also becomes possible to reduce the quantity of harmful near-infrared light. As a result, the quality of images can be improved.

As described above, in the image taking apparatus according to the embodiments of the present invention, the multi-layer film having a function to adjust the spectroscopic characteristic of light is provided between the first infrared-ray absorption filter and the second infrared-ray absorption filter so that the image taking apparatus satisfies conditions (1) to (4).

Thus, the first infrared-ray absorption filter, the multi-layer film and the second infrared-ray absorption filter absorb light components harmful to generation of an image and/or a video, reducing harmful light components incident on the image taking device. As a result, the quality of images can be improved.

In addition, the spectroscopic characteristic of light components harmful to generation of an image and/or a video and the luminance of the light components vary in accordance with electronic components placed on the photographing-object and image sides of the first infrared-ray absorption filter and the second infrared-ray absorption filter.

Thus, by determining the spectroscopic characteristics exhibited by the first infrared-ray absorption filter and the second infrared-ray absorption filter in accordance with the spectroscopic characteristic and the luminance, the spectroscopic characteristics exhibited by the first infrared-ray absorption filter and the second infrared-ray absorption filter can be optimized. As described above, the spectroscopic characteristic and the luminance are caused by the electronic components to serve as respectively the spectroscopic characteristic of light components, which are harmful to generation of an image and/or a video, and the luminance of the light components.

In addition, characteristics exhibited by a combination of the first infrared-ray absorption filter, the multi-layer film and the second infrared-ray absorption filter include characteristics of absorption and reflection for light having wavelengths in the range 400 nm to 1,200 nm. Thus, the spectroscopic intensity balance of light incident on the image taking device can be optimally adjusted. A typical example of the spectroscopic intensity balance is the light intensity balance among blue-color, green-color and red-color regions.

Accordingly, it is possible to well carry out the adjustment of the white balance between images and/or videos as well as color reproduction of the images and the videos. On top of that, it is also possible to prevent color noises from being generated due to execution of excessive electrical adjustment. As a result, it is possible to assure a light transmittance characteristic which optimizes the color reproduction of the images and the videos.

It is to be noted that, in an attempt made to reduce the size of the image taking optical system and the size of the image taking apparatus employing the image taking optical system, the transmittance (or the reflectance) of an incident light beam may change very abruptly in a wavelength region determined in advance or the quantity of stray light incident on the image taking device may change with ease.

Even with the reduced size of the image taking optical system and the reduced size of the image taking apparatus employing the image taking optical system, however, the image taking apparatus can be configured to satisfy conditions (1) to (4) so that it is possible to effectively prevent the quantity of stray light from rising and improve the color reproduction of an image and/or a video. As a result, the quality of images can be much improved.

Embodiment Implementing the Image Taking Apparatus

Figure 19:
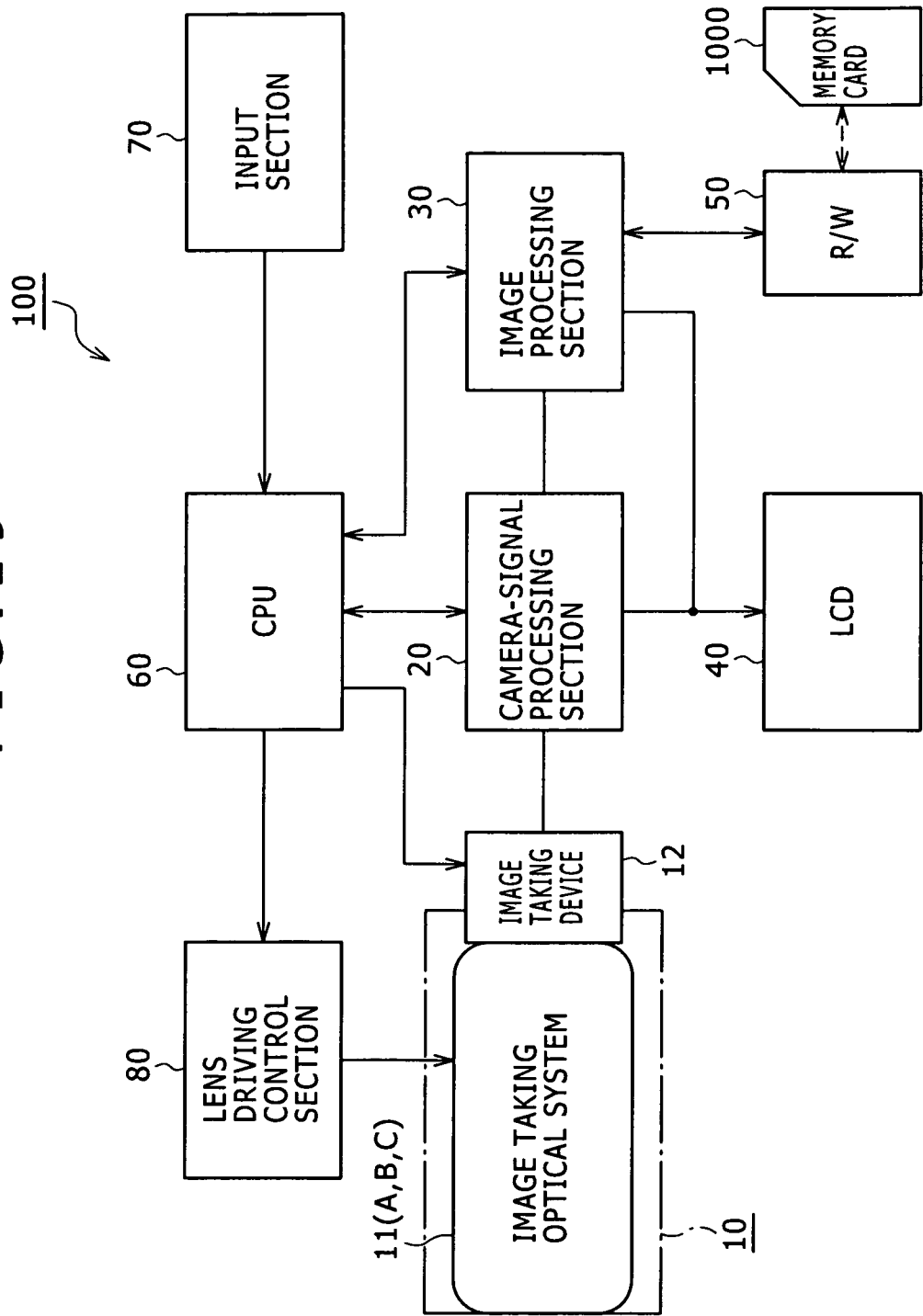
FIG. 19 is a block diagram showing an image taking apparatus according to an embodiment of the present invention.

FIG. 19 is a block diagram showing an embodiment implementing an image taking apparatus, which is provided by the present invention, to serve as a digital still camera.

As shown in the block diagram, the image taking apparatus 100 serving as a digital still camera employs a camera block 10, a camera-signal processing section 20 and an image processing section 30. The camera block 10 has an image taking function. The camera-signal processing section 20 is a section for carrying out signal processing including an analog-digital conversion process performed on an image signal supplied by the camera block 10. The image processing section is a section for carrying out processing to record the image signal and reproduce the image signal. In addition, the image taking apparatus 100 also has an LCD (Liquid Crystal Display) 40, an R/W (Read/Writer) 50 and a CPU (Central Processing Unit) 60. The LCD 40 is a section for displaying typically an image obtained as a result of a photographing operation. The R/W 50 is a section for storing an image signal into a memory card 1000 and reading out an image signal from the memory card 1000. The CPU 60 is a section for controlling the whole image taking apparatus 100. On top of that, the image taking apparatus 100 also includes an input section 70 and a lens driving control section 80. The input section 70 employs a variety of switches to be operated by the user to carry out required operations. The lens driving control section 80 is a section for carrying out control to drive lenses which are included in the camera block 10.

The camera block 10 has an optical system and an image taking device 12. The optical system includes an image taking optical system 11 which is an image-taking optical system A, B or C provided by the embodiments of the present invention as described before. Typical examples of the image taking device 12 are a CCD (Charge Coupled Device) and a CMOS (Complementary Metal-Oxide Semiconductor) device.

The camera-signal processing section 20 is a section for carrying out various kinds of signal processing which includes a process to convert an analog image signal output by the image taking device 12 into a digital image signal, a process to eliminate noises, a process to improve the quality of images and a process to convert an image signal into a luminance/color-difference signal.

The image processing section 30 is a section for carrying out processing such as a process to compress/code an image signal based on an image data format determined in advance, a process to decompress/decode such an image signal and a process to transform data specifications including a resolution.

The LCD 40 has a function to display various kinds of data. The data displayed on the LCD 40 includes operation status, which is set by the user by operating the input section 70, and images obtained as a result of a photographing operation.

The R/W 50 is a section for storing image data obtained as a result of the compression/coding process carried out by the image processing section 30 into the memory card 1000 and for reading out image data already stored in the memory card 1000 from the memory card 1000.

The CPU 60 functions as a control processing section for controlling each of circuit blocks which compose the image taking apparatus 100. The CPU 60 controls the circuit blocks on the basis of signals which include a command input signal received from the input section 70.

The input section 70 is typically configured to include a shutter release button to be operated by the user to carry out a shutter operation and a select switch to be operated by the user to select an operation mode. The input section 70 provides the CPU 60 with command input signals according to operations which are carried out by the user.

The lens driving control section 80 is a section for controlling a motor for driving a lens of the image taking optical system 11 on the basis of a control signal which is output by the CPU 60. It is to be noted that the motor itself is not shown in the block diagram of FIG. 19.

The memory card 1000 is a semiconductor memory which can typically be mounted on a slot connected to the R/W 50 and dismounted from the slot.

Next, operations carried out by the image taking apparatus 100 are explained as follows.

In a state of waiting for a photographing operation to be started, under control carried out by the CPU 60, an image signal obtained as a result of an image taking process carried out by the camera block 10 is output to the LCD 40 by way of the camera-signal processing section 20. The LCD 40 then displays a camera-through image based on the image signal. In addition, when the CPU 60 receives a command input signal for zooming from the input section 70, the CPU 60 outputs a control signal to the lens driving control section 80.

Then, a predetermined lens included in the image taking optical system 11 is moved in accordance with control which is carried out by the lens driving control section 80 on the basis of the control signal.

When a shutter of the camera block 10 is operated in accordance with a command input signal generated by the input section 70, an image signal obtained as a result of an image taking process is output from the camera-signal processing section 20 to the image processing section 30 which then carries out a compression/coding process on the image signal in order to convert the image signal into digital data having a data format determined in advance. It is to be noted that the shutter itself's not shown in the block diagram of FIG. 19. Subsequently, the image processing section 30 supplies the digital data obtained as a result of the conversion to the R/W 50 which then stores the data into the memory card 1000.

It is to be noted that a focusing process is carried out by the lens driving control section 80 by moving a predetermined lens of the image taking optical system 11 on the basis of a control signal which is received from the CPU typically when a shutter release button included in the input section 70 is half-pressed or fully pressed in order to carry out a data recording operation or a photographing operation.

In a process to reproduce predetermined image data stored in the memory card 1000, the R/W 60 reads out the image data from the memory card 1000 in accordance with an operation carried out on the input section 70. Subsequently, the image processing section 30 carries out a decompression/decoding process on the image data in order to generate a reproduced image signal. Finally, the image processing section 30 outputs the reproduced image signal to the LCD 40 which then displays a reproduced image based on the reproduced image signal.

As an example, the image taking apparatus is implemented by the embodiment described above to serve as a digital still camera. It is to be noted, however, that a range of apparatus to which the image taking apparatus provided by the embodiments of the present invention can be applied is by no means limited to the digital still camera. That is to say, the image taking apparatus provided by the embodiments of the present invention can be applied to a broad range of apparatus which include a digital video camera, a hand phone having a camera embedded therein and the camera section of a digital input/output apparatus such as a PDA (Personal Digital Assistant) having a camera embedded therein.

The shapes of all sections employed in the embodiments described above and all the numerical values used in the embodiments are no more than typical examples for implementing the present invention. That is to say, the shapes of all the sections employed in the embodiments described above and all the numerical values should not be interpreted as limitations imposed on the technological scope of the present invention.

It should be understood by those skilled in the art that various modifications, combinations, sub-combinations and alterations may occur depending on design requirements and other factor in so far as they are within the scope of the appended claims or the equivalents thereof.

What is claimed is:

1. An image taking optical system comprising
    at least one lens provided on an optical path;
    a first infrared-ray absorption filter made from a resin material with a film shape and provided on said optical path;
    a multi-layer film provided with an infrared-ray absorption function and provided on said optical path; and
    a second infrared-ray absorption filter made from a resin material with a film shape and provided on said optical path, wherein
    said first infrared-ray absorption filter, said multi-layer film and said second infrared-ray absorption filter are provided at locations arranged along said optical path in a direction from a photographing-object side to an image side, and
    said multi-layer film has a spectroscopic-characteristic adjustment function and a light reflection characteristic,
    said image taking optical system satisfying conditions (1) to (4) given as follows:

$$0.84 < R1/R2 < 1.2 \quad (1)$$

$$0.8 < \lambda 1/\lambda 2 < 1.25 \quad (2)$$

$$T2/T1 < 1.0 \quad (3)$$

$$T3/T4 < 0.05 \quad (4)$$

where
    reference notation R1 denotes an average reflectance exhibited by said multi-layer film for light having a wavelength in the range 680 nm to 780 nm, passing through said first infrared-ray absorption filter from said photographing-object side to be reflected by said multi-layer film and passing through said first infrared-ray absorption filter from said image side,
    reference notation R2 denotes an average reflectance exhibited by said multi-layer film for light having a wavelength in said range 680 nm to 780 nm, passing through said second infrared-ray absorption filter from said image side to be reflected by said multi-layer film and passing through said second infrared-ray absorption filter from said photographing-object side,
    reference notation $\lambda 1$ denotes the value of a wavelength for which a transmittance exhibited by said first infrared-ray absorption filter for light having a wavelength at least equal to 550 nm becomes equal to 70%,
    reference notation $\lambda 2$ denotes the value of a wavelength for which a transmittance exhibited by said second infrared-ray absorption filter for light having a wavelength at least equal to 550 nm becomes equal to 70%,
    reference notation T1 denotes an average transmittance exhibited by a combination of said first infrared-ray absorption filter and said second infrared-ray absorption filter for light having a wavelength in the range 700 nm to 725 nm,
    reference notation T2 denotes an average transmittance exhibited by said multi-layer film for light having a wavelength in said range 700 nm to 725 nm,
    reference notation T3 denotes a transmittance exhibited by a combination of said first infrared-ray absorption filter, said multi-layer film and said second infrared-ray absorption filter for light having a wavelength of 700 nm, and
    reference notation T4 denotes a transmittance exhibited by said combination of said first infrared-ray absorption filter, said multi-layer film and said second infrared-ray absorption filter for light having a wavelength of 540 nm.

2. The image taking optical system according to claim 1 wherein condition (5) given below is satisfied:

$$0.85 < \lambda 5/\lambda 6 \quad (5)$$

where
    reference notation $\lambda 5$ denotes the value of a wavelength for which a transmittance exhibited by said combination of said first infrared-ray absorption filter, said multi-layer film and said second infrared-ray absorption filter for light having a wavelength not greater than 450 nm becomes equal to 80%, and reference notation λ6 denotes the value of a wavelength for which a transmittance exhibited by said combination of said first infrared-ray absorption filter, said multi-layer film and said second infrared-ray absorption filter for light having a wavelength not greater than 450 nm becomes equal to 20%.

3. The image taking optical system according to claim 1 wherein an optical-axis direction thickness of each of said first infrared-ray absorption filter and said second infrared-ray absorption filter is not smaller than 10 μm and not greater than 120 μm.

4. The image taking optical system according to claim 1 wherein said multi-layer film is created on a glass substrate.

5. The image taking optical system according to claim 1 wherein said multi-layer film is created on said first infrared-ray absorption filter or said second infrared-ray absorption filter.

6. The image taking optical system according to claim 1 wherein an air layer is created at least between said first infrared-ray absorption filter and said multi-layer film or between said multi-layer film and said second infrared-ray absorption filter.

7. The image taking optical system according to claim 1 wherein said first infrared-ray absorption filter, said multi-layer film and said second infrared-ray absorption filter are provided at locations adhering closely to each other in an optical-axis direction.

8. The image taking optical system according to claim 1 wherein said first infrared-ray absorption filter, said multi-layer film and said second infrared-ray absorption filter are provided on said optical path at locations between a lens of the at least one lens closest to said image side and an image taking device.

9. The image taking optical system according to claim 1 wherein a basic material of each of said first infrared-ray absorption filter and said second infrared-ray absorption filter is created from a cyclic olefinic resin.

10. The image taking optical system according to claim 1 wherein a basic material of each of said first infrared-ray absorption filter and said second infrared-ray absorption filter includes a coloring agent exhibiting an infrared-ray absorption effect and an organic pigment of at least one type is used as said coloring agent.

11. An image taking apparatus comprising an image taking optical system and an image taking device for converting an optical image created by said image taking optical system into an electrical signal wherein said image taking optical system has at least one lens provided on an optical path;

a first infrared-ray absorption filter made from a resin material with a film shape and provided on said optical path;

a multi-layer film provided with an infrared-ray absorption function and provided on said optical path; and a second infrared-ray absorption filter made from a resin material with a film shape and provided on said optical path;

said first infrared-ray absorption filter, said multi-layer film and said second infrared-ray absorption filter are provided at locations arranged along said optical path in a direction from a photographing-object side to an image side;

said multi-layer film has a spectroscopic-characteristic adjustment function and a light reflection characteristic, and said image taking optical system satisfies conditions (1) to (4) given as follows:

$$0.84 < R1/R2 < 1.2 \quad (1)$$

$$0.8 < \lambda1/\lambda2 < 1.25 \quad (2)$$

$$T2/T1 < 1.0 \quad (3)$$

$$T3/T4 < 0.05 \quad (4)$$

where reference notation R1 denotes an average reflectance exhibited by said multi-layer film for light having a wavelength in said range 680 nm to 780 nm, passing through said first infrared-ray absorption filter from said photographing-object side to be reflected by said multi-layer film and passing through said first infrared-ray absorption filter from said image side, reference notation R2 denotes an average reflectance exhibited by said multi-layer film for light having a wavelength in said range 680 nm to 780 nm, passing through said second infrared-ray absorption filter from said image side to be reflected by said multi-layer film and passing through said second infrared-ray absorption filter from said photographing-object side, reference notation λ1 denotes the value of a wavelength for which a transmittance exhibited by said first infrared-ray absorption filter for light having a wavelength at least equal to 550 nm becomes equal to 70%, reference notation λ2 denotes the value of a wavelength for which a transmittance exhibited by said second infrared-ray absorption filter for light having a wavelength at least equal to 550 nm becomes equal to 70%, reference notation T1 denotes an average transmittance exhibited by a combination of said first infrared-ray absorption filter and said second infrared-ray absorption filter for light having a wavelength in said range 700 nm to 725 nm, reference notation T2 denotes an average transmittance exhibited by said multi-layer film for light having a wavelength in said range 700 nm to 725 nm, reference notation T3 denotes a transmittance exhibited by a combination of said first infrared-ray absorption filter, said multi-layer film and said second infrared-ray absorption filter for light having a wavelength of 700 nm, and reference notation T4 denotes a transmittance exhibited by said combination of said first infrared-ray absorption filter, said multi-layer film and said second infrared-ray absorption filter for light having a wavelength of 540 nm.

* * * * *